(12) United States Patent
Nishikawa et al.

(10) Patent No.: US 11,114,718 B2
(45) Date of Patent: Sep. 7, 2021

(54) ENERGY STORAGE APPARATUS AND METHOD OF MANUFACTURING ENERGY STORAGE APPARATUS

(71) Applicant: GS Yuasa International Ltd., Kyoto (JP)

(72) Inventors: Ryutaro Nishikawa, Kyoto (JP); Yuta Kawai, Kyoto (JP); Masamitsu Tononishi, Kyoto (JP); Shogo Tsuruta, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 47 days.

(21) Appl. No.: 15/763,543

(22) PCT Filed: Aug. 9, 2016

(86) PCT No.: PCT/JP2016/073442
§ 371 (c)(1),
(2) Date: Mar. 27, 2018

(87) PCT Pub. No.: WO2017/056742
PCT Pub. Date: Apr. 6, 2017

(65) Prior Publication Data
US 2018/0269438 A1    Sep. 20, 2018

(30) Foreign Application Priority Data
Sep. 29, 2015    (JP) .............................. JP2015-192336

(51) Int. Cl.
*H01M 50/183*    (2021.01)
*H01G 11/10*    (2013.01)
(Continued)

(52) U.S. Cl.
CPC .......... *H01M 50/183* (2021.01); *H01G 11/10* (2013.01); *H01G 11/82* (2013.01);
(Continued)

(58) Field of Classification Search
None
See application file for complete search history.

(56) References Cited

U.S. PATENT DOCUMENTS 3,215,304 A    11/1965    Andreas
3,623,916 A    11/1971    Toyooka
(Continued)

FOREIGN PATENT DOCUMENTS

CN    1722504 A    1/2006
CN    102447086 A    5/2012
(Continued)

OTHER PUBLICATIONS

International Search Report (ISR) (PCT Form PCT/ISA/210), in PCT/JP2016/073442, dated Nov. 8, 2016.
(Continued)

*Primary Examiner* — Carmen V Lyles-Irving
(74) *Attorney, Agent, or Firm* — McGinn IP Law Group, PLLC

(57) ABSTRACT

An energy storage apparatus which includes an energy storage device, an outer case, and an adhesive material which is injected between at least one surface out of a first surface and a second surface which are two surfaces of the energy storage device disposed adjacently to each other and an inner surface of the outer case thus making the at least one surface and the inner surface of the outer case adhere to each other by surface adhesion.

16 Claims, 17 Drawing Sheets

(51) Int. Cl.
    *H01G 11/82*     (2013.01)
    *H01G 11/84*     (2013.01)
    *H01M 50/20*     (2021.01)
    *H01M 50/124*     (2021.01)
    *H01M 50/209*     (2021.01)
    *H01M 50/543*     (2021.01)
    *H01M 10/0525*     (2010.01)
    *H01M 10/058*     (2010.01)
    *H01M 50/116*     (2021.01)

(52) U.S. Cl.
    CPC .......... *H01G 11/84* (2013.01); *H01M 10/058* (2013.01); *H01M 10/0525* (2013.01); *H01M 50/124* (2021.01); *H01M 50/20* (2021.01); *H01M 50/209* (2021.01); *H01M 50/543* (2021.01); *H01M 50/116* (2021.01)

(56) References Cited

U.S. PATENT DOCUMENTS

| | | |
|---|---|---|
| 2005/0069763 A1 | 3/2005 | Hong et al. |
| 2005/0238955 A1 | 10/2005 | Hooke |
| 2005/0282069 A1 | 12/2005 | Kim et al. |
| 2007/0037046 A1 | 2/2007 | Takahashi et al. |
| 2012/0094157 A1 | 4/2012 | Seto |
| 2012/0310566 A1 | 12/2012 | Hoshino et al. |
| 2013/0230746 A1 | 9/2013 | Byun |
| 2014/0295242 A1 | 10/2014 | Kimura |
| 2015/0188203 A1 | 7/2015 | Enomoto |
| 2018/0102573 A1* | 4/2018 | Tsuruta ............... H01M 10/613 |

FOREIGN PATENT DOCUMENTS

| | | |
|---|---|---|
| EP | 1 753 050 A2 | 2/2007 |
| EP | 1 804 328 A1 | 7/2007 |
| EP | 2 899 796 A1 | 7/2015 |
| JP | 2005-347233 A | 12/2005 |
| JP | 2006-080045 A | 3/2006 |
| JP | 2007-048725 A | 2/2007 |
| JP | 2009-277433 A | 11/2009 |
| JP | 2010-097723 A | 4/2010 |
| JP | 2011-071097 A | 4/2011 |
| JP | 2012-119158 A | 6/2012 |
| JP | 2013-012464 A | 1/2013 |
| JP | 2013-157112 A | 8/2013 |
| JP | 2015-106432 A | 6/2015 |
| JP | 2015-159068 A | 9/2015 |
| WO | WO 2013/076770 A1 | 5/2013 |

OTHER PUBLICATIONS

United States Office Action dated Nov. 12, 2019, in U.S. Appl. No. 15/714,125.

United States Office Action dated Mar. 31, 2020 in U.S. Appl. No. 15/714,125.

* cited by examiner

ENERGY STORAGE APPARATUS AND METHOD OF MANUFACTURING ENERGY STORAGE APPARATUS

TECHNICAL FIELD

The present invention relates to an energy storage apparatus which includes an energy storage device and an outer case and a method of manufacturing an energy storage apparatus.

BACKGROUND ART

Conventionally, there has been known an energy storage apparatus where a plurality of energy storage devices are accommodated in an outer case (see Patent Document 1, for example). In such an energy storage apparatus, the plurality of energy storage devices (battery cells) are adhered to the outer case (battery module case) by an adhesive agent or the like.

PRIOR ART DOCUMENT

Patent Document

Patent Document 1: JP-A-2010-97723

SUMMARY OF THE INVENTION

Problems to be Solved by the Invention

However, in the conventional energy storage apparatus, there exists a drawback that a step of adhering the energy storage devices to the outer case becomes cumbersome in a manufacturing process.

The present invention has been made to overcome the above-mentioned drawbacks, and it is an object of the present invention to provide an energy storage apparatus and a method of manufacturing an energy storage apparatus where energy storage devices can be easily adhered to an outer case.

Means for Solving the Problems

To achieve the above-mentioned object, an energy storage apparatus according to an aspect of the present invention includes an energy storage device, an outer case and an adhesive material which is injected between at least one surface out of a first surface and a second surface which are two surfaces of the energy storage device disposed adjacently to each other and an inner surface of the outer case thus making the at least one surface and the inner surface of the outer case adhere to each other by surface adhesion.

Advantages of the Invention

According to the energy storage apparatus of the present invention, the energy storage device can be easily adhered to the outer case.

MODE FOR CARRYING OUT THE INVENTION

Figure 1:
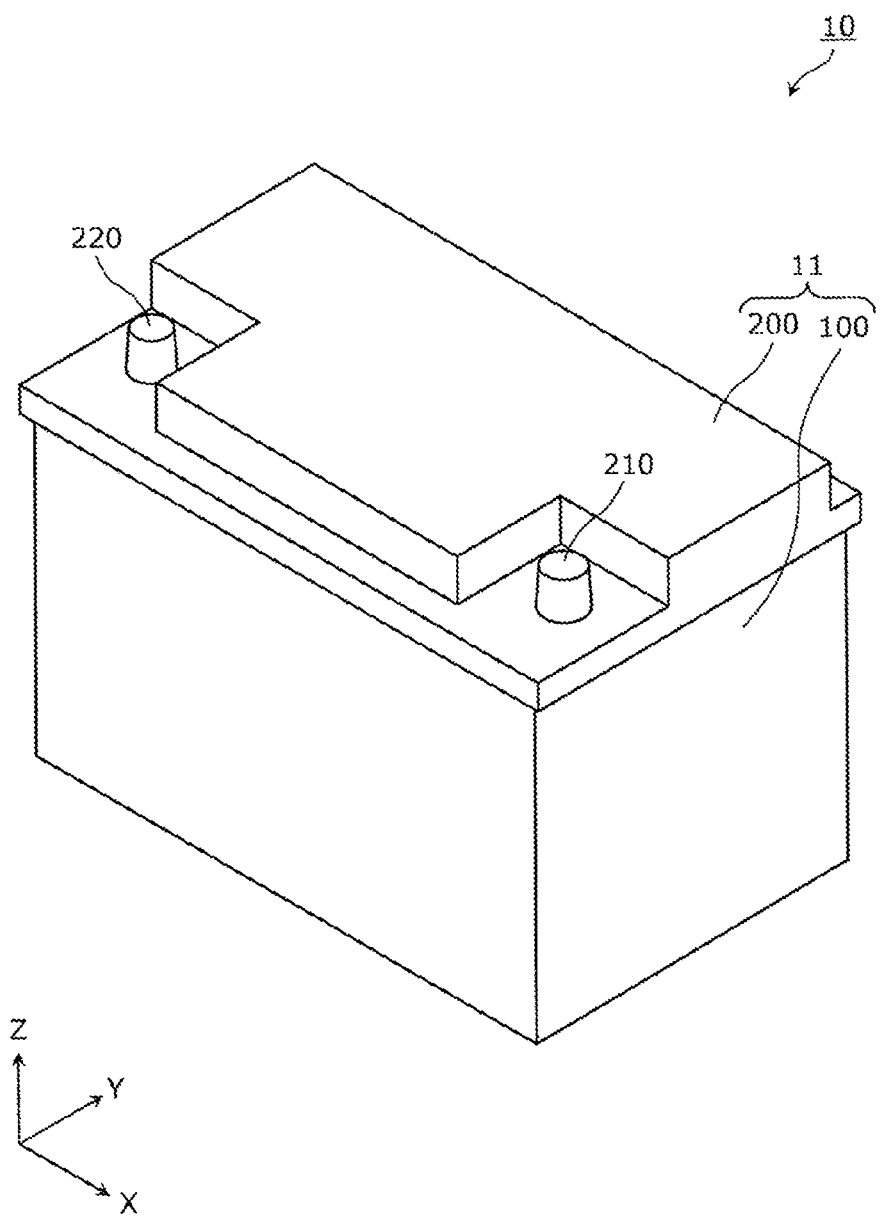
FIG. 1 is a perspective view showing an external appearance of an energy storage apparatus according to an embodiment of the present invention.

In the conventional energy storage apparatus, there exists a drawback that a step of adhering the energy storage devices to the outer case becomes cumbersome in a manufacturing process. That is, in the conventional energy storage apparatus, in general, the energy storage device is adhered to the outer case by applying an adhesive agent to an outer surface of the energy storage device or an inner surface of the outer case. However, there may be a case where an operation of applying the adhesive agent becomes difficult. For example, when an adhesive agent is applied to a surface to be applied of the energy storage device or the outer case using equipment for applying adhesive agent, it is necessary to accurately move the equipment toward the surface to be applied and, at the same time, it is necessary to accurately move the equipment along the surface to be applied. In this manner, in an operation of applying an adhesive agent, there is a case where a step of adhering the energy storage device to the outer case becomes cumbersome.

The present invention has been made to overcome the above-mentioned drawbacks, and it is an object of the present invention to provide an energy storage apparatus and a method of manufacturing an energy storage apparatus where energy storage devices can be easily adhered to an outer case.

To achieve the above-mentioned object, an energy storage apparatus according to an aspect of the present invention includes an energy storage device, an outer case and an adhesive material which is injected between at least one surface out of a first surface and a second surface which are two surfaces of the energy storage device disposed adjacently to each other and an inner surface of the outer case thus making the at least one surface and the inner surface of the outer case adhere to each other by surface adhesion.

With such a configuration, the energy storage apparatus includes the adhesive material which is injected between at least one surface out of two surfaces disposed adjacently to each other of the energy storage device and the inner surface of the outer case. Assuming a case where an adhesive material is injected into the outer case, it is sufficient to inject the adhesive material by moving equipment for injecting an adhesive material toward the inside of the outer case and hence, an operation of adhering the energy storage device to the outer case can be performed easily compared to a case where an adhesive agent is applied to the energy storage device or the outer case. Since the energy storage apparatus is configured such that the energy storage apparatus includes the adhesive material injected into the outer case, the energy storage device can be easily adhered to the outer case.

A projecting portion which projects toward the energy storage device may be formed on a portion of the inner surface of the outer case which is adhered to the energy storage device by surface adhesion by the adhesive material.

With such a configuration, the projecting portion is formed on an adhesive surface of the outer case with the energy storage device and hence, a thickness of the adhesive material can be defined by a height of the projecting portion. Accordingly, the thickness of the adhesive material can be set to an optimum thickness so that the energy storage device can be easily and firmly adhered to the outer case.

A flow passage for the adhesive material which traverses the projecting portion may be formed on the inner surface of the outer case and on a side of the projecting portion.

With such a configuration, the flow passage for the adhesive material is formed on the side of the projecting portion. Accordingly, after injecting of the adhesive material, when an amount of the adhesive material is large, it is possible to make the adhesive material flow out through the flow passage. Further, when an amount of the adhesive material is small, it is possible to make the adhesive material flow in through the flow passage. Accordingly, an amount of the adhesive material can be adjusted by the flow passage and hence, the energy storage device can be easily and firmly adhered to the outer case.

The projection portion may include two projections which extend along the inner surface of the outer case, and the flow passage may be sandwiched by two projecting portions. A distance between the two projecting portions may be narrowed as the projecting portions approach the flow passage.

With such a configuration, two projecting portions where the distance between the projecting portions is narrowed as the projecting portions approach the flow passage are arranged on both sides of the flow passage for the adhesive material. Accordingly, when an amount of the adhesive material is large, a surplus amount of adhesive material flows to the flow passage while being guided by the projecting portions and is made to flow out from the flow passage. As a result, a surplus amount of adhesive material can be easily made to flow out by the projecting portions and hence, an amount of adhesive material can be easily adjusted.

The energy storage apparatus may include a plurality of energy storage devices, and a plurality of projecting portions may be formed on the inner surface of the outer case corresponding to the respective energy storage devices.

With such a configuration, the plurality of projecting portions are formed for each energy storage device and hence, each energy storage device can be easily adhered to the outer case while being supported by the plurality of projecting portions.

The energy storage device may include an electrode terminal, and the projecting portion may be arranged at a position where at least a portion of the projecting portion overlaps with a region ranging from an electrode terminal to an end portion of the energy storage device as viewed in a projecting direction of the projecting portion.

With such a configuration, at least a portion of the projecting portion is arranged just below the region ranging from the electrode terminal to the end portion of the energy storage device. Accordingly, in fixing the energy storage device by pressing the electrode terminal or the end portion of the energy storage device, the energy storage device can be stably fixed to the outer case.

The energy storage device may be arranged in the outer case without being exposed from a wall surface of the outer case.

With such a configuration, the energy storage apparatus is configured such that the energy storage device is not exposed from the wall surface of the outer case. Accordingly, the energy storage device can be easily adhered to the outer case while suppressing protrusion of the injected adhesive material to the outside of the outer case.

The outer case may include a partition portion which partitions an inside of the outer case so as to form an accommodating portion for the energy storage device.

With such a configuration, the energy storage apparatus is configured such that the energy storage device is arranged in the accommodating portion partitioned by the partition portion in the outer case. Accordingly, it is possible to easily adhere the energy storage device to the outer case while easily positioning the energy storage device.

The outer case may include a recessed portion which forms a gap between an inner surface of the outer case and the first surface and the second surface of the energy storage device, and the adhesive material may be injected into the recessed portion and adhere the first surface and the second surface of the energy storage device and the inner surface of the outer case to each other by surface adhesion.

With such a configuration, the energy storage apparatus is configured such that two surfaces of the energy storage device disposed adjacently to each other and the outer case are adhered to each other by the adhesive material injected in the recessed portion of the outer case. Accordingly, the energy storage device can be easily and firmly adhered to the outer case.

The first surface may be a bottom surface of the energy storage device and the second surface is a side surface of the energy storage device. The adhesive material may be injected between the first surface and the inner surface of the outer case and between the second surface ranging from a lower end of the side surface to a predetermined height from the lower end and the inner surface of the outer case.

With such a configuration, the energy storage apparatus is configured to include the adhesive material which is injected into the outer case such that the adhesive material reaches the predetermined height of the side surface of the energy storage device. Accordingly, the energy storage device can be easily and firmly adhered to the outer case.

Further, to achieve the above-mentioned object, a method of manufacturing an energy storage apparatus according to an aspect of the present invention, is a method of manufacturing an energy storage apparatus which includes an energy storage device and an outer case, the method includes: an arrangement step of arranging the energy storage device in the outer case; an injecting step of injecting an adhesive material into the outer case; and an adhesion step of adhering at least one surface out of a first surface and a second surface which are two surfaces of the energy storage device disposed adjacently to each other to an inner surface of the outer case by surface adhesion by performing the arrangement step and the injecting step.

With such steps, in the method of manufacturing an energy storage apparatus, at least one surface out of two surfaces of the energy storage device disposed adjacently to each other can be adhered to the inner surface of the outer case by surface adhesion by injecting the adhesive material such as an adhesive agent into the outer case. In injecting the adhesive material into the outer case, it is sufficient to only inject the adhesive material by moving equipment for injecting the adhesive material toward the inside of the outer case. Accordingly, compared to a conventional case where an adhesive material is applied to an energy storage device or an outer case, the adhering operation can be usually performed easily. Accordingly, the energy storage device can be easily adhered to the outer case by injecting the adhesive material into the outer case.

The injecting step may include a post-arrangement injecting step where an adhesive material is injected between at least one surface out of the first surface and the second surface of the energy storage device and the inner surface of the outer case after the arrangement step.

With such a step, by injecting the adhesive material between at least one surface out of the first surface and the second surface of the energy storage device and the inner surface of the outer case after the energy storage device is disposed in the outer case. Accordingly, the energy storage device can be easily adhered to the outer case.

In the post-arrangement injecting step, an adhesive material may be injected between the first surface and the second surface of the energy storage device and the inner surface of the outer case, and in the adhesion step, the first surface and the second surface of the energy storage device may be adhered to the inner surface of the outer case by surface adhesion.

With such a step, by injecting an adhesive material between two surfaces of the energy storage device disposed adjacently to each other and the inner surface of the outer case, such two surfaces of the energy storage device can be adhered to the inner surface of the outer case. Accordingly, the energy storage device can be easily and firmly adhered to the outer case.

Further, the injecting step may include an ante-arrangement injecting step where an adhesive material is injected on a surface of the outer case which oppositely faces the first surface of the energy storage device in the outer case before the arrangement step, and in the arrangement step, the energy storage device may be arranged in the outer case such that an adhesive material is arranged between the first surface and the second surface of the energy storage device and the inner surface of the outer case, and in the adhesion step, the first surface and the second surface of the energy storage device may be adhered to the inner surface of the outer case by surface adhesion.

With such a step, an adhesive material is injected onto a surface of the outer case which oppositely faces the first surface of the energy storage device before the energy storage device is arranged in the outer case, and the energy storage device is arranged such that the adhesive material is routed around between the first surface and the second surface and the inner surface of the outer case thus adhering the energy storage device to the outer case. Accordingly, the energy storage device can be easily and firmly adhered to the outer case.

Hereinafter, an energy storage apparatus according to an embodiment of the present invention and a method of manufacturing the energy storage apparatus are described with reference to drawings. The embodiment described hereinafter is one preferred specific example of the present invention. In the embodiment described hereinafter, numerical values, shapes, materials, constitutional elements, the arrangement positions and connection states of the constitutional elements, respective steps in the method of manufacturing an energy storage apparatus, the order of respective steps and the like are merely exemplified as one example, and these are not intended to be used for limiting the present invention. Further, out of the constitutional elements in the embodiment described hereinafter, the constitutional elements which are not described in independent claims describing an uppermost concept are described as arbitrary constitutional elements. In the respective drawings, the respective constitutional elements are not described strictly accurately in size or the like.

Embodiment

First, the configuration of an energy storage apparatus 10 is described.

Figure 2:
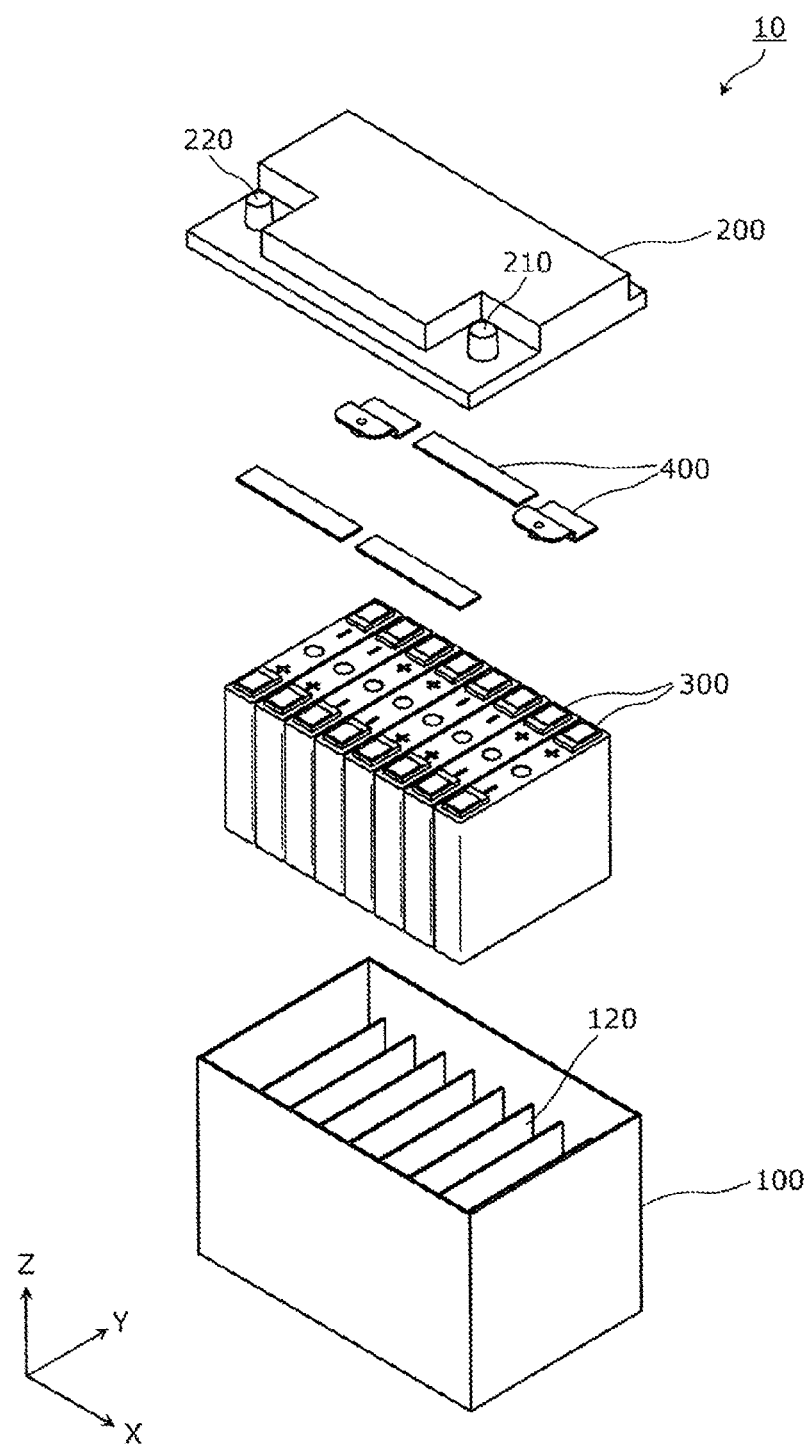
FIG. 2 is an exploded perspective view of respective constitutional elements of the energy storage apparatus according to the embodiment of the present invention in a disassembled state.

FIG. 1 is a perspective view showing an external appearance of the energy storage apparatus 10 according to an embodiment of the present invention. FIG. 2 is an exploded perspective view showing respective constitutional elements of the energy storage apparatus 10 according to the embodiment of the present invention in a disassembled state.

In these drawings, the Z axis direction is indicated as the vertical direction, and the description is made hereinafter using a Z axis direction as the vertical direction. However, there may be also a case where the Z axis direction is not the vertical direction depending on a mode of use and hence, the Z axis direction is not limited to the vertical direction. The same goes also for drawings which are referenced hereinafter.

The energy storage apparatus 10 is an apparatus which can charge electricity from the outside of the energy storage apparatus 10 therein or can discharge electricity to the outside of the energy storage apparatus 10. For example, the energy storage apparatus 10 is a battery module used for power storage application, power source application or the like. As shown in FIG. 1 and FIG. 2, the energy storage apparatus 10 includes an outer case 11, a plurality of energy storage devices 300 are accommodated in the outer case 11, bus bars 400 and the like.

The outer case 11 is a container (module case) having a rectangular shape (box shape) which forms an outer case of the energy storage apparatus 10. That is, the outer case 11 is disposed outside the energy storage devices 300 and the bus bars 400, and allows the energy storage devices 300 and the like to be disposed at predetermined positions thus protecting the energy storage devices 300 and the like from an impact or the like. For example, the outer case 11 is made of an electrically-insulating resin material such as polycarbonate (PC), polypropylene (PP), polyethylene (PE), a polyphenylene sulfide resin (PPS), polybutylene terephthalate (PBT) or an acrylonitrile butadiene styrene (ABS) resin. Accordingly, the outer case 11 prevents the energy storage devices 300 and the like from coming into contact with a metal member or the like disposed outside the outer case 11.

In this embodiment, the outer case 11 includes an outer case body 100 and a lid body 200.

The outer case body 100 is a member which constitutes a body portion of the outer case 11. To be more specific, the outer case body 100 is a bottomed rectangular cylindrical housing having an opening on an upper portion thereof. The plurality of energy storage devices 300 are inserted and accommodated in the outer case body 100 through the opening. To be more specific, the outer case body 100 includes a plurality of partition portions 120 inside thereof. Each of the energy storage devices 300 is inserted and accommodated in a space defined between each two partition portions 120 disposed adjacently to each other out of the plurality of partition portions 120. The detailed configuration of the outer case body 100 is described later.

The lid body 200 is a member which constitutes a lid portion of the outer case 11, and is a flat rectangular cover member which closes the opening of the outer case body 100. On the lid body 200, a positive electrode external terminal 210 and a negative electrode external terminal 220 are mounted. The energy storage apparatus 10 charges electricity from the outside therein through the positive electrode external terminal 210 and discharges electricity to the outside through the negative electrode external terminal 220.

The outer case body 100 and the lid body 200 may be made of the same material, or may be made of different materials. Further, electric equipment such as a printed circuit board and a relay may be disposed in the outer case 11.

The energy storage device 300 is a secondary battery (battery cell) which can charge or discharge electricity. To be more specific, the energy storage device 300 is a nonaqueous electrolyte secondary battery such as a lithium ion secondary battery. The energy storage device 300 has a flat rectangular shape and, in this embodiment, eight energy storage devices 300 are arranged in a row in the X axis direction in the outer case 11. The energy storage device 300 is not limited to a nonaqueous electrolyte secondary battery, and may be a secondary battery other than a nonaqueous electrolyte secondary battery, or may be a capacitor. Also, the number of energy storage devices 300 accommodated in the outer case 11 is not limited. The detailed configuration of the energy storage device 300 is described later.

The bus bars 400 are plate-like members made of an electrically-conductive material such as metal which are disposed above the plurality of energy storage devices 300 and electrically connect the plurality of energy storage devices 300 to each other. To be more specific, with respect to the energy storage devices 300 disposed adjacently to each other, the bus bar 400 connects a positive electrode terminal or a negative electrode terminal of one energy storage device 300 with a negative electrode terminal or a positive electrode terminal of another energy storage device 300. In this embodiment, four sets of energy storage device groups are provided where each set of energy storage device group is formed by connecting two energy storage devices 300 in parallel by the bus bars 400, and four sets of energy storage device groups are connected to each other in series by the bus bars 400. The bus bars 400 may be configured to connect all eight energy storage devices 300 in series or may have other configurations.

Figure 3:
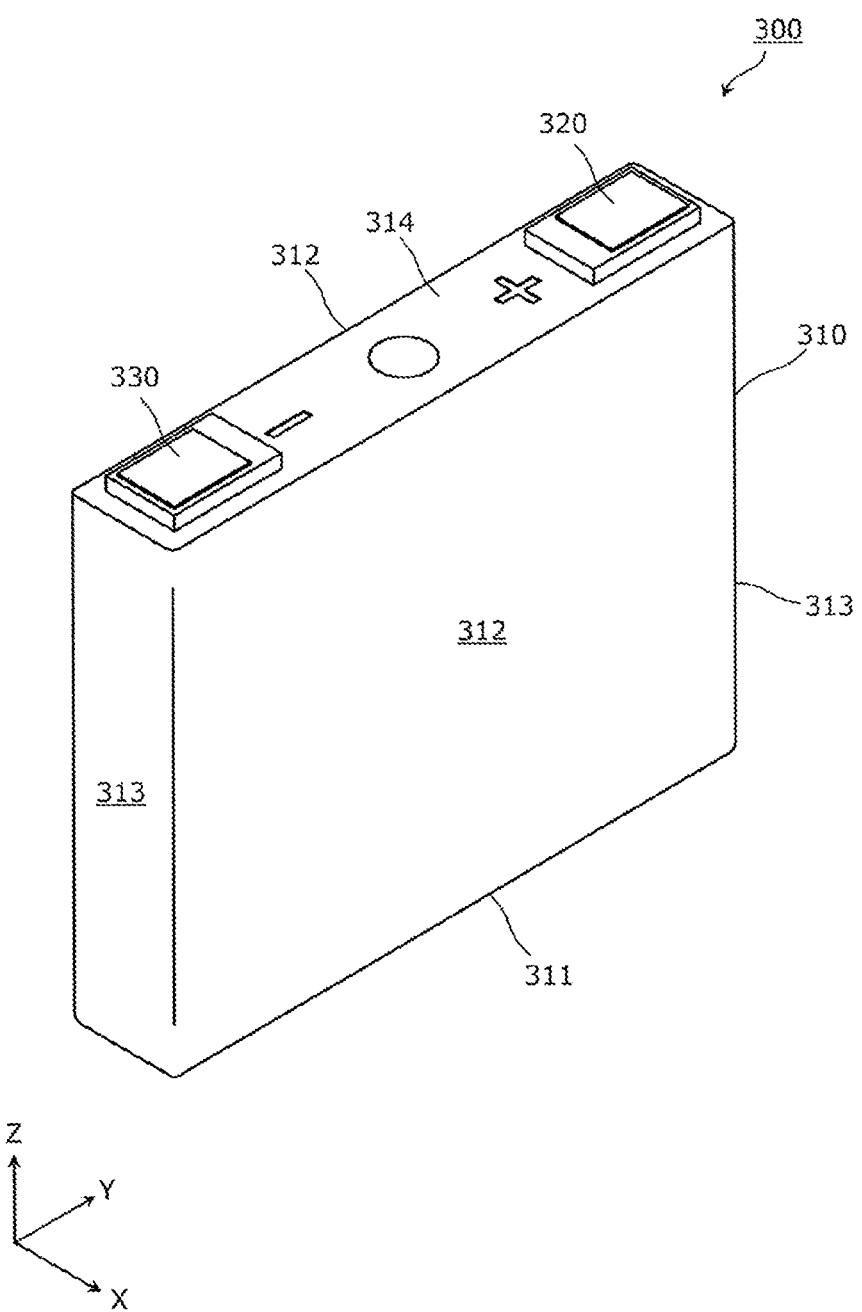
FIG. 3 is a perspective view showing an external appearance of an energy storage device according to the embodiment of the present invention.

Next, the configuration of the energy storage device 300 is described in detail. FIG. 3 is a perspective view showing an external appearance of the energy storage device 300 according to the embodiment of the present invention.

As shown in FIG. 3, the energy storage device 300 includes a container 310, a positive electrode terminal 320 and a negative electrode terminal 330. An electrode assembly (power generating element), a positive electrode current collector, a negative electrode current collector and the like are disposed in the container 310, and a liquid such as an electrolyte solution (nonaqueous electrolyte) is sealed in the container 310. However, the illustrations of these elements are omitted, and the detailed descriptions with respect to these elements are also omitted.

The container 310 is a rectangular parallelepiped (angular-shaped) container having a bottom surface portion 311 disposed on a minus side in the Z axis direction in the drawing, long side surface portions 312 disposed on side surfaces of the container 310 on both sides in the X axis direction, short side surface portions 313 disposed on side surfaces of the container 310 on both sides in the Y axis direction, and a container lid portion 314 disposed on a plus side in the Z axis direction. The bottom surface portion 311 is a portion having a rectangular shape which forms a bottom surface of the container 310, the long side surface portions 312 are portions having a rectangular shape which form long side surfaces of the container 310, the short side surface portions 313 are portions having a rectangular shape which form short side surfaces of the container 310. Further, the container lid portion 314 is a member having a rectangular shape which forms a lid of the container 310.

That is, the container 310 is configured such that a rectangular cylindrical bottomed container body is formed of the bottom surface portion 311, two long side surface portions 312, and two short side surface portions 313, and the opening of the container body is closed by the container lid portion 314. To be more specific, the container 310 is configured such that the inside of the container 310 can be hermetically sealed by joining the container body and the container lid portion 314 to each other by welding or the like after the electrode assembly and the like are accommodated in the container body.

Although a material for forming the container 310 (the container body and the container lid portion 314) is not particularly limited, it is preferable that the container 310 be made of weldable metal such as stainless steel, aluminum or an aluminum alloy, for example. To the container lid portion 314, a gas release valve for releasing a pressure in the container 310 is provided. However, the detailed description of the gas release valve is omitted.

The electrode assembly accommodated in the container 310 may be a winding-type electrode assembly formed by winding a negative electrode, a positive electrode, and a separator or may be an electrode assembly formed by stacking flat-plate-like plates. Further, as a positive active material or a negative active material used for forming the electrode assembly, known materials can be suitably used provided that performance of the energy storage device 300 is not impaired. Also, with respect to an electrolyte solution sealed in the container 310, a kind of the electrolyte solution is not particularly limited and various kinds of electrolyte solution can be selected provided that performance of the energy storage device 300 is not impaired.

The positive electrode terminal 320 is an electrode terminal which is electrically connected to the positive electrode of the electrode assembly through a positive electrode current collector, the negative electrode terminal 330 is an electrode terminal which is electrically connected to the negative electrode of the electrode assembly through a negative electrode current collector, and both the positive electrode terminal 320 and the negative electrode terminal 330 are mounted on the container lid portion 314. That is, the positive electrode terminal 320 and the negative electrode terminal 330 are metal-made electrode terminals through which electricity stored in the electrode assembly is discharged to a space outside the energy storage device 300, and through which electricity is introduced into a space inside the energy storage device 300 for storing electricity in the electrode assembly. In this embodiment, the energy storage devices 300 are disposed in a state where the positive electrode terminals 320 and the negative electrode terminals 330 are directed upward.

To be more specific, with respect to the plurality of energy storage devices 300 which the energy storage apparatus 10 includes, the positive electrode terminal 320 of the energy storage device 300 disposed on a positive electrode external terminal 210 side (a plus side in the X axis direction in FIG. 2) is connected to the positive electrode external terminal 210 through the bus bar 400. In the same manner, the negative electrode terminal 330 of the energy storage device 300 which is disposed on a negative electrode external terminal 220 side (a minus side in the X axis direction in FIG. 2) is connected to the negative electrode external terminal 220 through the bus bar 400. With respect to other energy storage devices 300, the positive electrode terminal 320 or the negative electrode terminal 330 of another energy storage device 300 is connected to the positive electrode terminal 320 or the negative electrode terminal 330 of still another energy storage device 300 through the bus bar 400.

Figure 4:
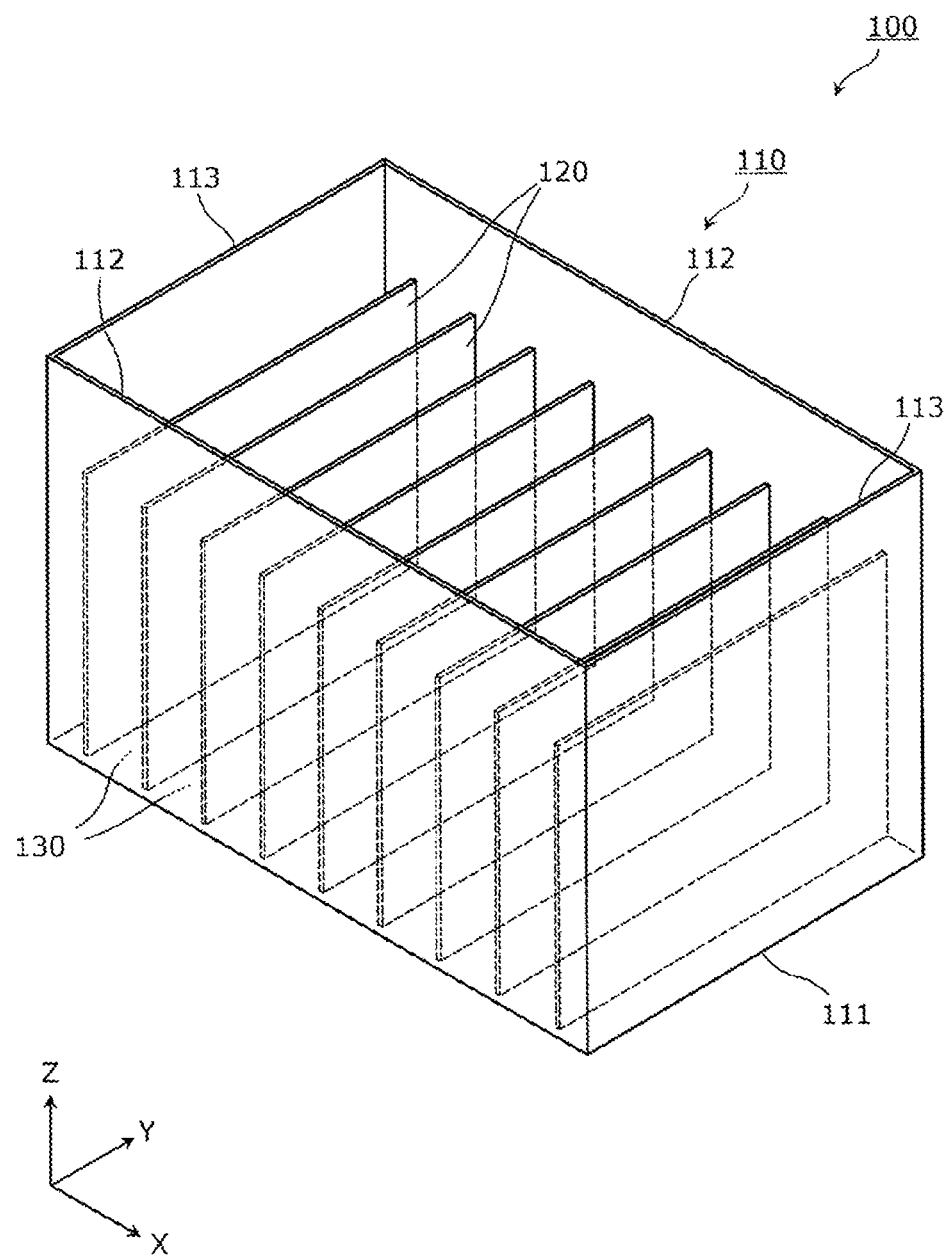
FIG. 4 is a perspective view showing the configuration of an outer case body according to the embodiment of the present invention.

Next, the configuration of the outer case body 100 of the outer case 11 is described in detail. FIG. 4 is a perspective view showing the configuration of the outer case body 100 according to the embodiment of the present invention.

As shown in FIG. 4, the outer case body 100 includes a casing 110, and the partition portions 120. The casing 110 has a bottom wall portion 111 disposed on a minus side in the Z axis direction, two side wall portions 112 disposed on both sides in the Y axis direction, and two side wall portions 113 disposed on both sides in the X axis direction.

The bottom wall portion 111 is a rectangular-shaped flat-plate-like portion which forms a bottom wall of the outer case body 100. The side wall portions 112 are rectangular-shaped flat-plate-like portions which are erected from long side end edges of the bottom wall portion 111 and form long side walls of the outer case body 100 respectively. Further, the side wall portions 113 are rectangular-shaped flat-plate-like portions which are erected from short side end edges of the bottom wall portion 111 and form short side walls of the outer case body 100.

That is, the casing 110 is a bottomed rectangular cylindrical member which is formed of the bottom wall portion 111, and the side wall portions 112, 113 surrounding four sides of the bottom wall portion 111. The casing 110 has an opening on an upper portion thereof. In the casing 110, no openings are formed other than the opening formed on the upper portion of the casing 110. That is, no opening is formed in the bottom wall portion 111, and the side wall portions 112, 113.

The partition portions 120 are rectangular-shaped flat-plate-like partition plates which are disposed in the casing 110 and partition the plurality energy storage devices 300. The partition portion 120 is disposed between each two neighboring energy storage devices 300 among the plurality of energy storage devices 300, and sides of the energy storage devices 300 disposed at end portions of the plurality of energy storage devices 300. That is, the partition portions 120 are disposed at positions where each energy storage device 300 is sandwiched by the partition portions 120 from both sides of the energy storage device 300. To be more specific, the partition portions 120 are disposed between two side wall portions 112 in an extending manner, and are connected to the bottom wall portion 111 and two side wall portions 112 respectively. In this embodiment, nine partition portions 120 are disposed for eight energy storage devices 300.

Due to the provision of the partition portions 120, accommodating portions 130 for accommodating the energy storage devices 300 are formed in the outer case body 100. The accommodating portion 130 is a rectangular parallelepiped space surrounded by two partition portions 120 and the bottom wall portion 111 and two side wall portions 112 of the casing 110, and the energy storage device 300 is accommodated in each accommodating portion 130. That is, the accommodating portions 130 are portions for accommodating the energy storage devices 300 which are formed by partitioning an internal space of the casing 110 by the partition portions 120. The energy storage device 300 is accommodated in each accommodating portion 130 formed in the outer case body 100 in such a manner that the energy storage device 300 is inserted between two partition portions 120 through the opening formed on an upper portion of the casing 110. In other words, the outer case body 100 includes the partition portions 120 which partition the inside of the outer case body 100 into the accommodating portions 130 for accommodating the energy storage devices 300. In this embodiment, eight accommodating portions 130 are disposed for eight energy storage devices 300.

As described above, no opening is formed in the wall surfaces of the casing 110 (the bottom wall portion 111 and the side wall portions 112, 113). Accordingly, no opening is formed in the wall surfaces of the outer case body 100 which forms the accommodating portions 130. With such a configuration, the energy storage devices 300 are disposed in the accommodating portions 130 formed in the outer case body 100 without being exposed from the wall surfaces of the outer case body 100. Provided that the energy storage devices 300 are not exposed from the wall surfaces of the outer case body 100, it may be possible to form some openings such as a screw hole or an exhaust port in the wall surfaces of the outer case body 100.

Figure 5A:
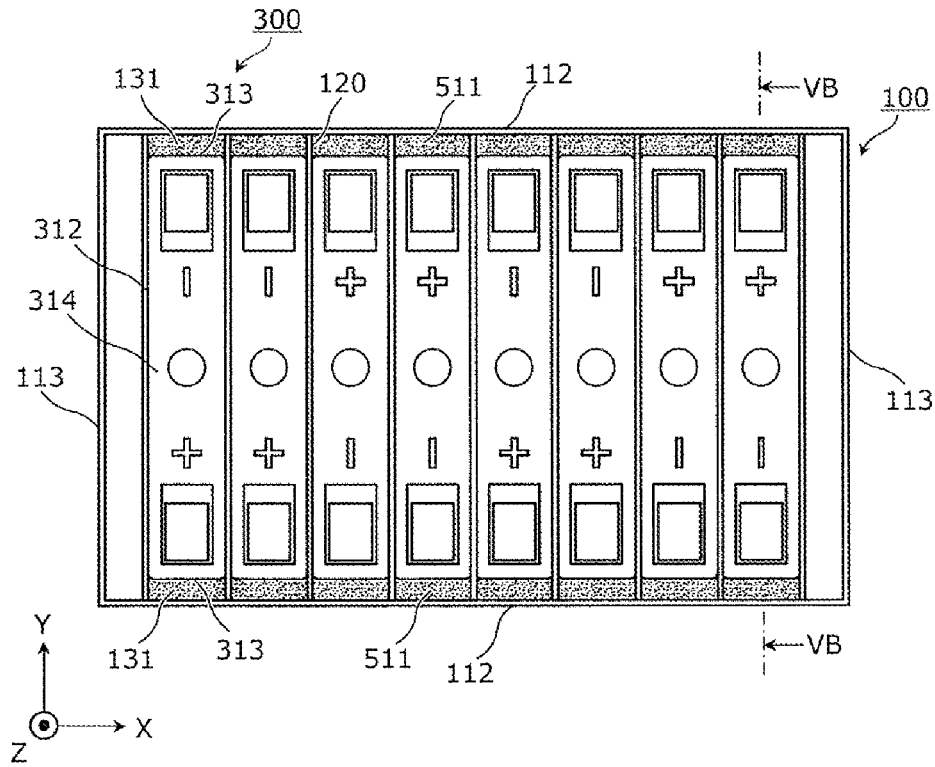
FIG. 5A is a plan view showing the configuration where the energy storage devices according to the embodiment of the present invention are accommodated in the outer case body.
Figure 5B:
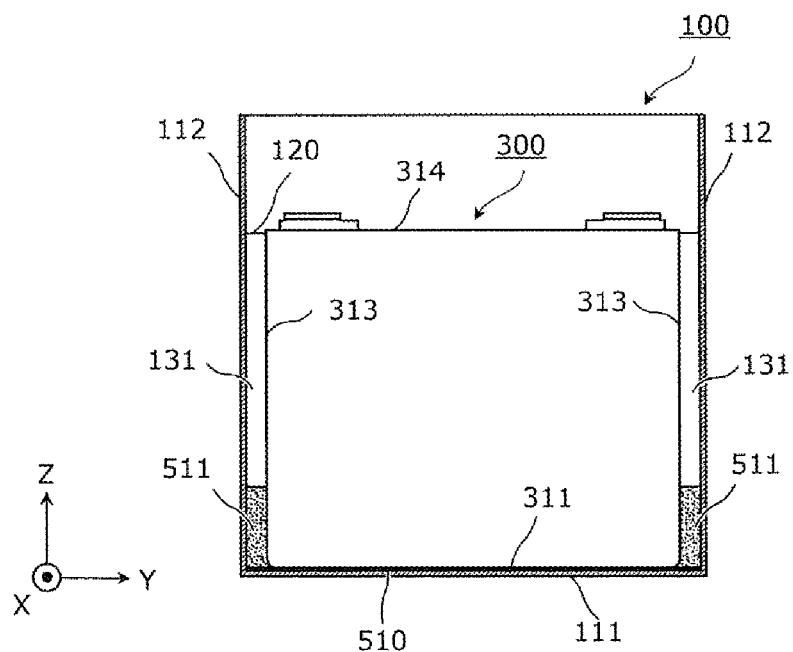
FIG. 5B is a cross-sectional view showing the configuration where the energy storage devices according to the embodiment of the present invention are accommodated in the outer case body.

Next, a state where the plurality of energy storage devices 300 are accommodated in the outer case body 100 is described. FIG. 5A is a plan view showing the configuration where the energy storage devices 300 according to the embodiment of the present invention are accommodated in the outer case body 100. To be more specific, FIG. 5A is a plan view of the configuration as viewed from a plus side in the Z axis direction where the lid body 200 and the bus bars 400 are removed from the energy storage apparatus 10. FIG. 5B is a cross-sectional view showing the configuration where the energy storage devices 300 according to the embodiment of the present invention are accommodated in the outer case body 100. To be more specific, FIG. 5B is a cross-sectional view of the configuration shown in FIG. 5A taken along line VB-VB.

As shown in these drawings, the plurality of respective energy storage devices 300 are disposed in a state where the respective energy storage devices 300 are accommodated in the plurality of respective accommodating portions 130 formed by partitioning the inside of the outer case body 100 by the partition portions 120. To be more specific, each energy storage device 300 is accommodated at a center portion of each accommodating portion 130 such that the bottom surface portion 311 oppositely faces the bottom wall portion 111 of the outer case body 100, two long side surface portions 312 are respectively brought into contact with two partition portions 120, and the container lid portion 314 is directed upward.

An adhesive material 510 is disposed between the bottom surface portion 311 of the energy storage device 300 and the bottom wall portion 111 of the outer case body 100. That is, the adhesive material 510 is an adhesive agent which is injected (filled) between an outer surface (first surface) of the bottom surface portion 311 of the energy storage device 300 and an inner surface of the bottom wall portion 111 of the outer case body 100 and makes the outer surface (the first surface) of the bottom surface portion 311 and the inner surface of the bottom wall portion 111 adhere to each other by surface adhesion.

The surface adhesion means a state where the outer surface and the inner surface are adhered to each other over a face-shaped region, and is a concept which excludes a state where the surfaces are adhered to each other over a line-shaped region and a state where the surfaces are adhered to each other in a point-shaped region. In this embodiment, the adhesive material 510 is disposed over the entire outer surface of the bottom surface portion 311 of the energy storage device 300 and makes the outer surface of the bottom surface portion 311 and the inner surface of the bottom wall portion 111 of the outer case body 100 adhere to each other by surface adhesion. Further, as the adhesive agent, it is possible to use an adhesive agent which is in a liquid form before being injected (filled) and is solidified after being injected (filled) so as to make the surfaces adhere to each other by surface adhesion, an adhesive agent which is in the form of gel before injected, a solid-form adhesive agent such as a hot-melt adhesive agent or the like.

Further, gaps 131 are formed between the short side surface portions 313 of the energy storage device 300 and the side wall portions 112 of the outer case body 100. That is, the gap 131 is a space surrounded by the short side surface portion 313, the side wall portion 112, the bottom wall portion 111 and the partition portions 120 in the accommodating portion 130. In this embodiment, two gaps 131 are formed on both short side surface sides (both sides in the Y axis direction) of the energy storage device 300 between the short side surface portions 313 and the side wall portions 112 respectively.

An adhesive material 511 is disposed in the gap 131 formed between the short side surface portion 313 of the energy storage device 300 and the side wall portion 112 of the outer case body 100. That is, the adhesive material 511 is an adhesive agent which is injected into the gap 131 formed between the outer surface (the second surface) of the short side surface portion 313 of the energy storage device 300 and the inner surface of the side wall portion 112 of the outer case body 100 and makes the outer surface (the second surface) of the short side surface portion 313 and the inner surface of the side wall portion 112 adhere to each other by surface adhesion. In this embodiment, the adhesive material 511 is injected into the gap 131 such that an injecting height of the adhesive material 511 becomes approximately one fifth to one fourth of a height of the short side surface portion 313 of the energy storage device 300. However, the injecting height of the adhesive material 511 is not particularly limited.

As has been described above, the energy storage apparatus 10 includes an adhesive material which is injected between at least one surface out of the first surface (the outer surface of the bottom surface portion 311) and the second surface (the outer surface of the short side surface portion 313) which are two surfaces of the energy storage device 300 disposed adjacently to each other and the inner surface of the outer case 11 and makes the above-mentioned at least one surface and the inner surface of the outer case 11 adhere to each other by surface adhesion. In this embodiment, the energy storage apparatus 10 includes the adhesive materials 510, 511 which are injected between two surfaces, that is, the first surface (the outer surface of the bottom surface portion 311) and the second surface (the outer surface of the short side surface portion 313) and the inner surfaces of the outer case body 100 respectively and make these two surfaces adhere to the inner surfaces of the outer case body 100 by surface adhesion.

Next, a method of manufacturing the energy storage apparatus 10 is described. Hereinafter, in the method of manufacturing the energy storage apparatus 10, the description is made in detail with respect to a step of adhering the energy storage device 300 to the outer case 11 and the description of other steps are omitted.

Figure 6:
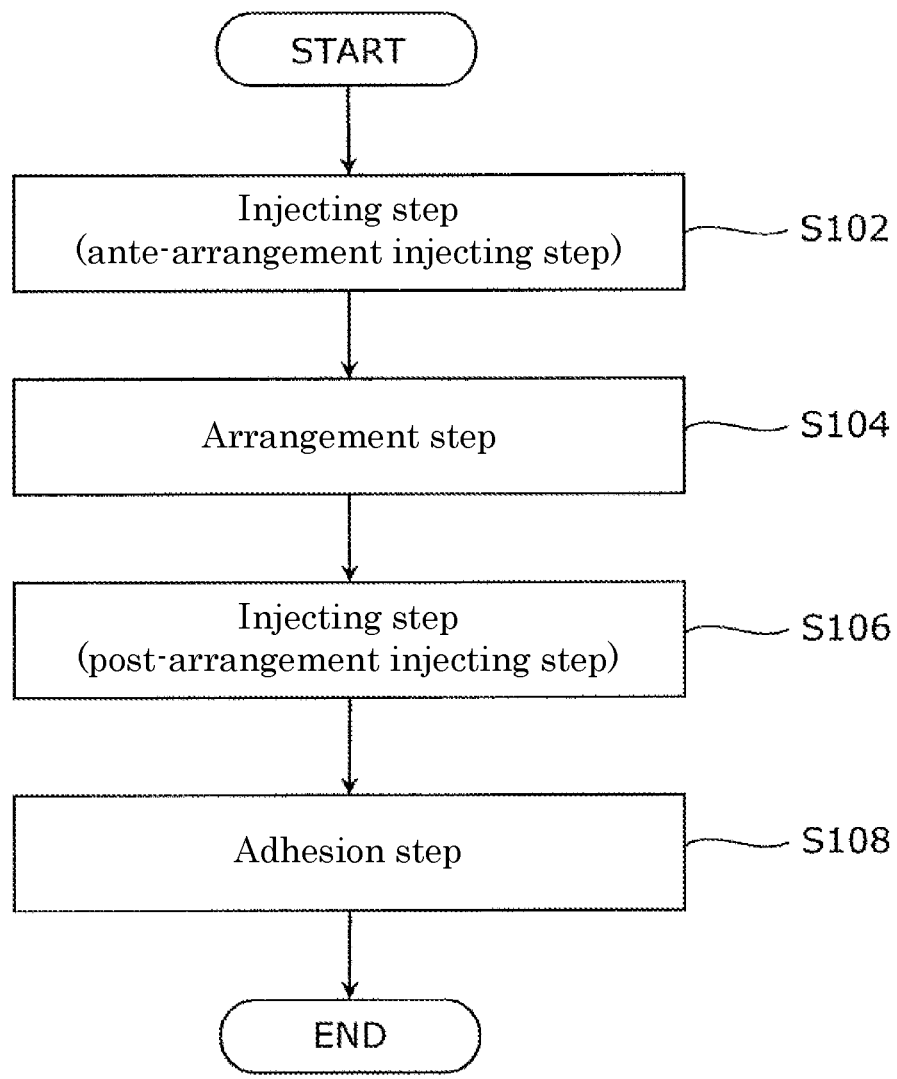
FIG. 6 is a flowchart showing steps of adhering the energy storage device to an outer case in a method of manufacturing an energy storage apparatus according to the embodiment of the present invention.
Figure 7:
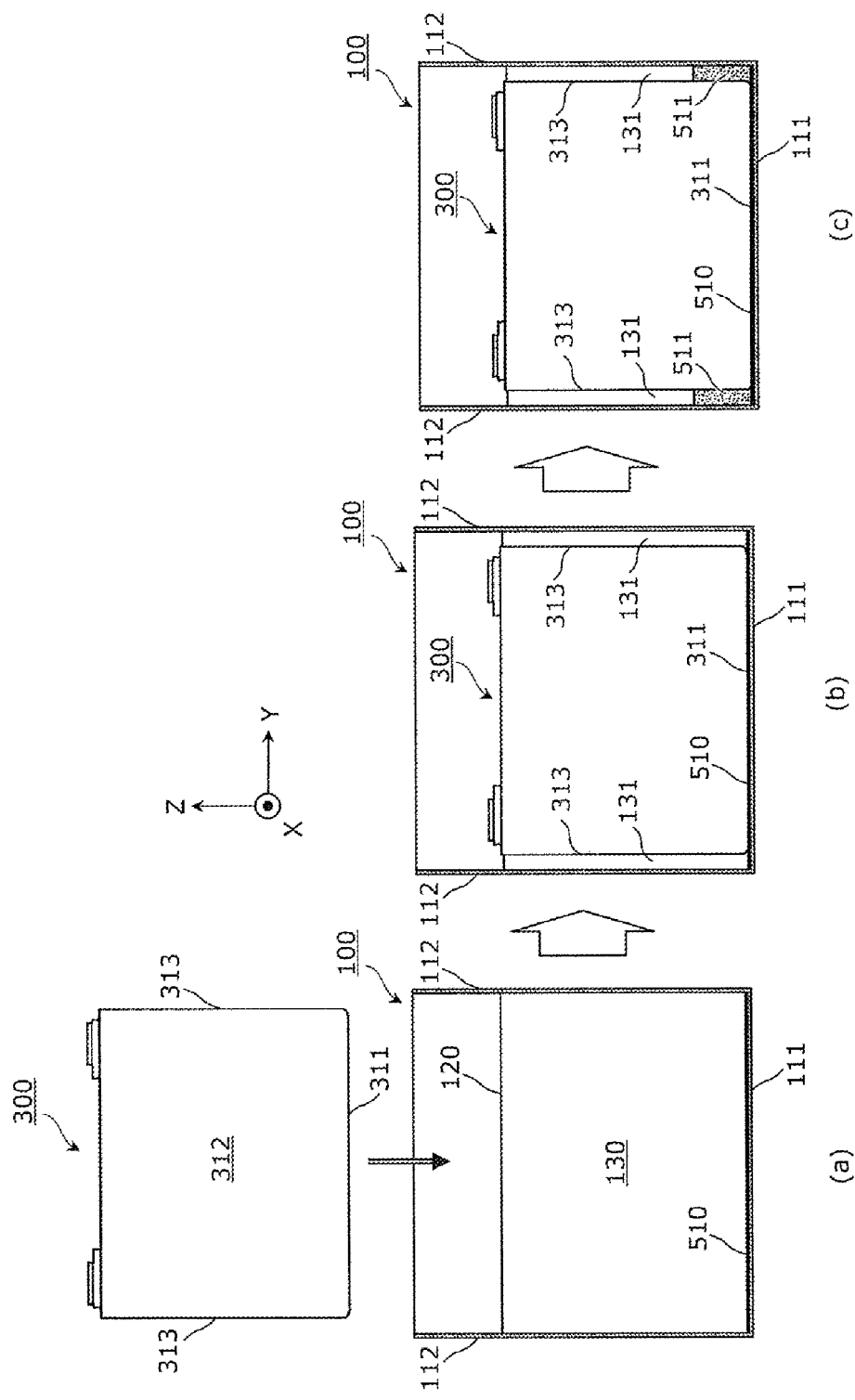
FIG. 7 is a view for describing the steps of adhering the energy storage device to the outer case in the method of manufacturing an energy storage apparatus according to the embodiment of the present invention.

FIG. 6 is a flowchart showing steps of adhering the energy storage device 300 to the outer case 11 in the method of manufacturing the energy storage apparatus 10 according to the embodiment of the present invention. FIG. 7 is a view for describing the steps of adhering the energy storage device 300 to the outer case 11 in the method of manufacturing the energy storage apparatus 10 according to the embodiment of the present invention.

Firstly, as shown in FIG. 6, as an injecting step (ante-arrangement injecting step), an adhesive agent is injected into the outer case 11 (S102). That is, before an arrangement step described later is performed, the adhesive agent is injected onto a surface of the outer case 11 in the outer case 11 which oppositely faces the first surface of the energy storage device 300. To be more specific, as shown in (a) of FIG. 7, the adhesive material 510 is injected onto the surface of the outer case 11 in the outer case 11 (the inner surface of the bottom wall portion 111 of the outer case body 100) which oppositely faces the first surface (the outer surface of the bottom surface portion 311) of the energy storage device 300.

Returning to FIG. 6, next, as an arrangement step, the energy storage device 300 is disposed in the outer case 11 (S104). That is, the energy storage device 300 is disposed in the outer case 11 such that the adhesive material is disposed between the first surface of the energy storage device 300 and the inner surface of the outer case 11. To be more specific, as shown in (b) of FIG. 7, the energy storage device 300 is disposed in the outer case body 100 such that the adhesive material 510 is disposed between the outer surface of the bottom surface portion 311 and the inner surface of the bottom wall portion 111.

No opening is formed in the wall surfaces of the outer case body 100 and hence, in the arrangement step, the energy storage device 300 is disposed in the accommodating portion 130 for the energy storage device 300 which is formed by partitioning the inside of the outer case 11 by the partition portions 120 without exposing the energy storage device 300 from the wall surfaces of the outer case 11.

Returning to FIG. 6, the injecting step (a post-arrangement injecting step) is performed as a next step. In the injecting step, an adhesive material is injected in the outer case 11 (S106). That is, after the arrangement step, an adhesive material is injected between at least one surface out of the first surface and the second surface of the energy storage device 300 and the inner surface of the outer case 11. In this embodiment, in the post-arrangement injecting step, an adhesive material is injected between the second surface of the energy storage device 300 and the inner surface of the outer case 11. To be more specific, as shown in (c) of FIG. 7, the adhesive material 511 is injected in the gaps 131 between the second surfaces (the outer surfaces of the short side surface portions 313) of the energy storage device 300 and the inner surfaces (the inner surfaces of the side wall portions 112 of the outer case body 100) of the outer case 11.

Returning to FIG. 6, next, as an adhering step, by performing the arrangement step and the injecting steps (the ante-arrangement injecting step and the post-arrangement injecting step), at least one surface out of the first surface and the second surface which are two surfaces of the energy storage device 300 disposed adjacently to each other is adhered to the inner surface of the outer case 11 by surface adhesion (S108). In this embodiment, in the adhering step, the first surface and the second surface of the energy storage device 300 are adhered to the inner surfaces of the outer case 11 by surface adhesion. That is, since the adhesive materials 510, 511 are solidified due to drying or the like after the arrangement step and the injecting steps, the outer surface of the bottom surface portion 311 and the outer surfaces of the short side surface portions 313 of the energy storage device 300 are adhered to the inner surface of the bottom wall portion 111 and the inner surfaces of the side wall portions 112 of the outer case body 100 by surface adhesion.

As has been described above, in the method of manufacturing the energy storage apparatus 10 according to the embodiment of the present invention, by injecting an adhesive material such as an adhesive agent into the outer case 11, at least one surface out of two surfaces of the energy storage device 300 disposed adjacently to each other is adhered to the inner surface of the outer case 11 by surface adhesion. In this embodiment, by injecting an adhesive material between two surfaces of the energy storage device 300 disposed adjacently to each other and the inner surfaces of the outer case 11 respectively, two surfaces of the energy storage device 300 can be adhered to the inner surfaces of the outer case 11 by surface adhesion respectively.

In this embodiment, in injecting an adhesive material into the outer case 11, it is sufficient to inject the adhesive material by moving equipment for injecting an adhesive material toward the inside of the outer case 11. Accordingly, an operation of adhering the energy storage device 300 to the outer case 11 can be usually performed easily compared to a conventional case where an adhesive material is applied to the energy storage device 300 or the outer case 11. As a result, the energy storage device 300 can be easily adhered to the outer case 11 by injecting an adhesive material into the outer case 11. Further, by adhering two surfaces of the energy storage device 300 disposed adjacently to each other to the inner surfaces of the outer case 11 respectively, the energy storage device 300 can be easily and firmly adhered to the outer case 11.

Further, by injecting an adhesive material between at least one surface (the second surface) of the energy storage device 300 and the inner surface of the outer case 11 after arranging the energy storage device 300 in the outer case 11, the second surface of the energy storage device 300 can be easily adhered to the inner surface of the outer case 11.

In the conventional energy storage apparatus, in adhering an energy storage device to an outer case, there exists a possibility that the energy storage device is positionally displaced or an adhesive material protrudes from an opening formed in the outer case. When the energy storage device is positionally displaced, it is necessary to correct the positional displacement of the energy storage device and, when an adhesive material protrudes from the opening of the outer case, it is necessary to process the protruded adhesive material and hence, a step of adhering the energy storage device to the outer case becomes cumbersome.

To the contrary, in the method of manufacturing the energy storage apparatus 10, by arranging the energy storage device 300 in the accommodating portion 130 for the energy storage device 300 in the outer case 11, the energy storage device 300 can be easily positioned. Further, the energy storage device 300 is disposed in the outer case 11 without being exposed from the wall surfaces of the outer case 11 and hence, it is possible to prevent the injected adhesive material from protruding to the outside of the outer case 11.

The energy storage apparatus 10 according to the embodiment of the present invention includes an adhesive material which is injected between at least one surface out of two surfaces of the energy storage device 300 disposed adjacently to each other and the inner surface of the outer case 11. In this embodiment, the energy storage apparatus 10 includes the adhesive materials 510, 511 which are injected between the first surface and the second surface which are two surfaces of the energy storage device 300 disposed adjacently to each other and the inner surfaces of the outer case 11 respectively. Accordingly, as described above, in the energy storage apparatus 10, the energy storage device 300 can be easily adhered to the outer case 11.

The energy storage apparatus 10 is configured such that the energy storage device 300 is disposed in the accommodating portion 130 formed by partitioning the inside of the outer case 11 by the partition portions 120. Accordingly, it is possible to easily adhere the energy storage device 300 to the outer case 11 while easily positioning the energy storage device 300.

The energy storage apparatus 10 is configured such that the energy storage device 300 is not exposed from the wall surfaces of the outer case 11. Accordingly, the energy storage device 300 can be easily adhered to the outer case 11 while suppressing protrusion of an injected adhesive material to the outside of the outer case 11.

By fixing the energy storage device 300 to the outer case 11, the movement of the energy storage device 300 in the outer case 11 is restricted. Accordingly, it is possible to suppress the occurrence of a phenomenon that the energy storage device 300 is moved so that a load is applied to the bus bar 400. It is also possible to suppress the occurrence of a phenomenon that the energy storage device 300 impinges on other members in the outer case 11 thus generating sound, and such an advantageous effect leads to the improvement of the quality. Further, it is unnecessary to provide a binding member for binding the energy storage devices 300 and hence, the number of parts can be reduced thus realizing the reduction of cost.

(Modification 1)

Next, a modification 1 of the above-mentioned embodiment is described. In the above-mentioned embodiment, after the arrangement step (S104 in FIG. 6), the post-arrangement injecting step (S106 in FIG. 6) is performed. However, in this modification, the post-arrangement injecting step is not performed.

Figure 8:
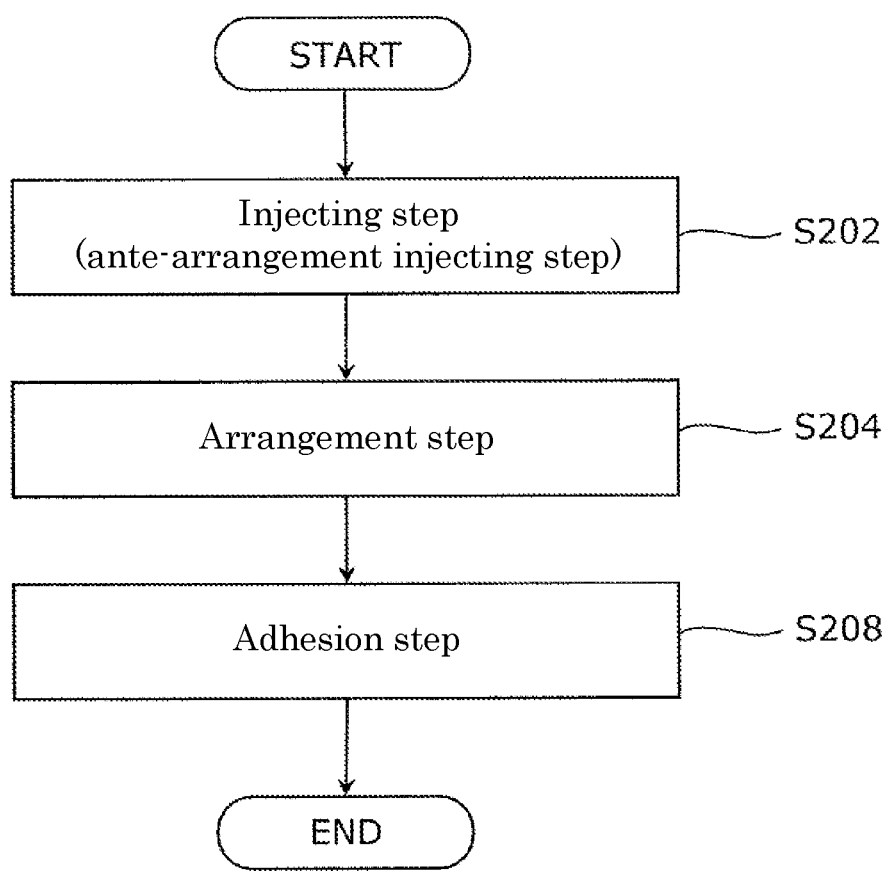
FIG. 8 is a flowchart showing steps of adhering an energy storage device to an outer case in a method of manufacturing an energy storage apparatus according to a modification 1 of the embodiment of the present invention.
Figure 9:
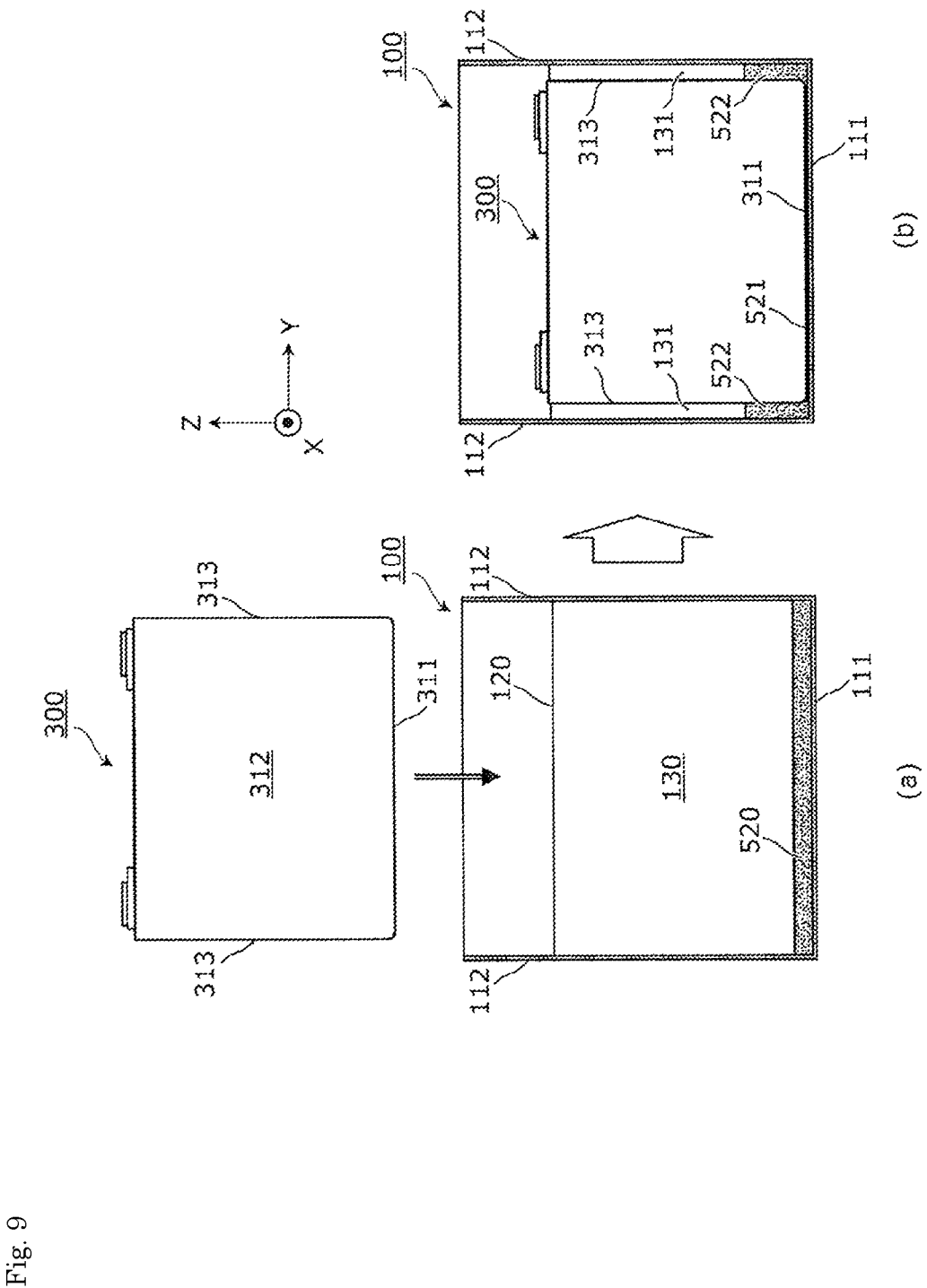
FIG. 9 is a view for describing the steps of adhering the energy storage device to the outer case in the method of manufacturing an energy storage apparatus according to the modification 1 of the embodiment of the present invention.

FIG. 8 is a flowchart showing steps of adhering an energy storage device 300 to an outer case 11 in a method of manufacturing an energy storage apparatus 10 according to the modification 1 of the embodiment of the present invention. FIG. 9 is a view for describing the steps of adhering the energy storage device 300 to the outer case 11 in the method of manufacturing the energy storage apparatus 10 according to the modification 1 of the embodiment of the present invention.

First, as shown in FIG. 8, as an injecting step (an ante-arrangement injecting step), an adhesive material is injected into the outer case 11 (S202). That is, before an arrangement step described later is performed, an adhesive material is, in the outer case 11, injected onto a surface of the outer case 11 which oppositely faces a first surface of the energy storage device 300. To be more specific, as shown in (a) of FIG. 9, in the outer case 11, an adhesive material 520 is injected onto a surface of the outer case 11 (an inner surface of a bottom wall portion 111 of the outer case body 100) which oppositely faces a first surface (an outer surface of a bottom surface portion 311) of the energy storage device 300. In this modification, a larger amount of adhesive material 520 (for example, a sum of an amount of the adhesive material 510 and an amount of the adhesive material 511) than an amount of the adhesive material 510 which is injected in the ante-arrangement injecting step (S102 in FIG. 6) in the above-mentioned embodiment is injected.

Returning to FIG. 8, next, as an arrangement step, the energy storage device 300 is disposed in the outer case 11 (S204). That is, the energy storage device 300 is disposed in the outer case 11 such that an adhesive material is disposed between the first surface and a second surface of the energy storage device 300 and inner surfaces of the outer case 11 respectively. To be more specific, as shown in (b) of FIG. 9, the energy storage device 300 is disposed in the outer case body 100 such that an adhesive material 521 is disposed between the first surface (the outer surface of the bottom surface portion 311) of the energy storage device 300 and the inner surface of the bottom wall portion 111, and an adhesive material 522 is disposed in gaps 131 formed between the second surfaces (outer surfaces of short side surface portions 313) of the energy storage device 300 and inner surfaces of side wall portions 112.

That is, by inserting the energy storage device 300 into the outer case body 100, a portion of the adhesive material 520 moves from a bottom surface portion 311 side to a short side surface portion 313 side of the energy storage device 300. In this manner, the adhesive material 520 which remains on the bottom surface portion 311 side forms the adhesive material 521, and the adhesive material 520 which moves to the short side surface portion 313 forms the adhesive material 522.

In the same manner as the above-mentioned embodiment, no opening is formed in wall surfaces of the outer case body 100. Accordingly, in the arrangement step, the energy storage device 300 can be disposed in an accommodating portion 130 for the energy storage device 300 which is formed by partitioning the inside of the outer case 11 by partition portions 120 without being exposed from the wall surfaces of the outer case 11.

Returning to FIG. 8, next, as an adhering step, by performing the arrangement step and the injecting step (ante-arrangement injecting step), the first surface and the second surface which are two surfaces of the energy storage device 300 disposed adjacently to each other are adhered to the inner surfaces of the outer case 11 by surface adhesion (S208). That is, since the adhesive materials 521, 522 are solidified due to drying or the like after the arrangement step and the injecting step, the outer surface of the bottom surface portion 311 and the outer surfaces of the short side surface portions 313 of the energy storage device 300 are adhered to the inner surface of the bottom wall portion 111 and the inner surfaces of the side wall portions 112 of the outer case body 100 respectively by surface adhesion.

As has been described above, the method of manufacturing the energy storage apparatus 10 according to the modification 1 of the embodiment of the present invention can acquire substantially the same advantageous effects as the above-mentioned embodiment. Particularly, in this modification, an adhesive material is injected onto the surface of the outer case 11 which oppositely faces the first surface of the energy storage device 300 before the energy storage device 300 is disposed in the outer case 11, and the energy storage device 300 is disposed such that the adhesive material is routed around between the first surface and the second surfaces and the inner surfaces of the outer case 11 thus adhering the energy storage device 300 to the outer case 11. With such a configuration, the energy storage device 300 can be easily and firmly adhered to the outer case 11.

(Modification 2)

Next, a modification 2 of the above-mentioned embodiment is described. In the above-mentioned embodiment, the ante-arrangement injecting step (S102 in FIG. 6) is performed before the arrangement step (S104 in FIG. 6). However, in this modification, an applying step is performed before an arrangement step.

Figure 10:
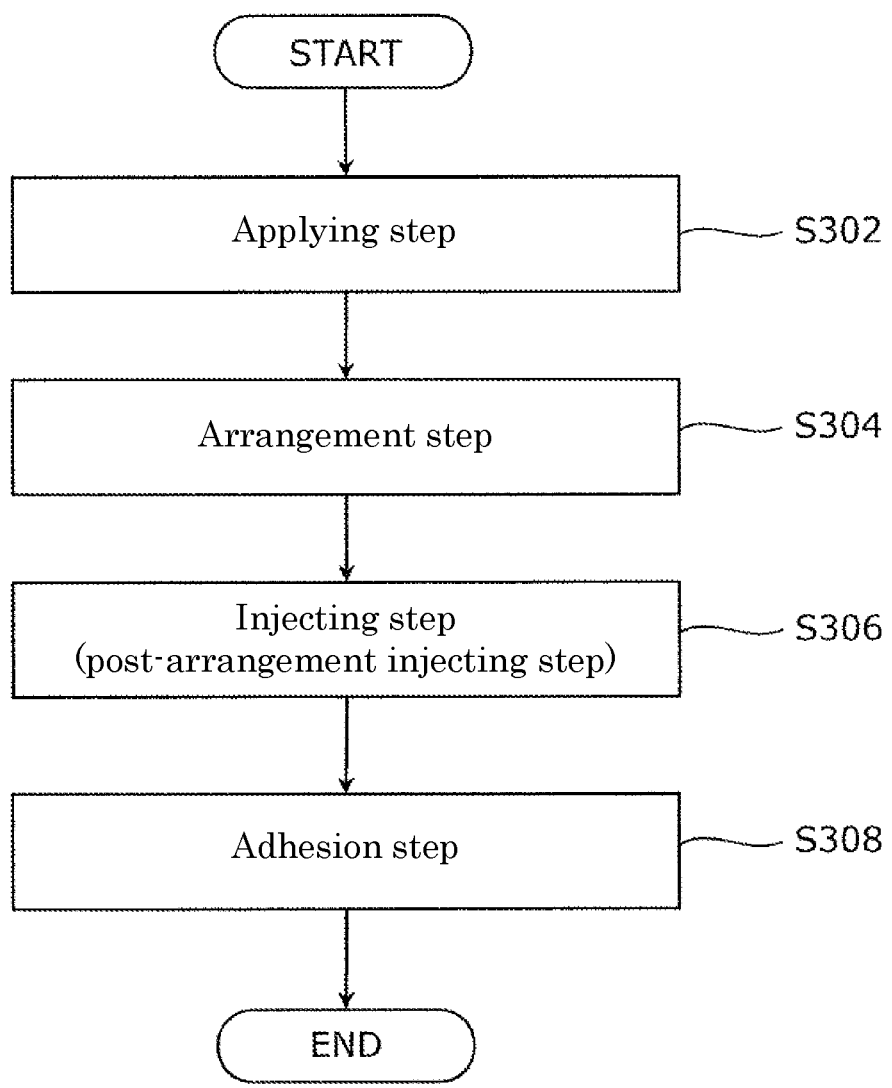
FIG. 10 is a flowchart showing steps of adhering an energy storage device to an outer case in a method of manufacturing an energy storage apparatus according to a modification 2 of the embodiment of the present invention.
Figure 11:
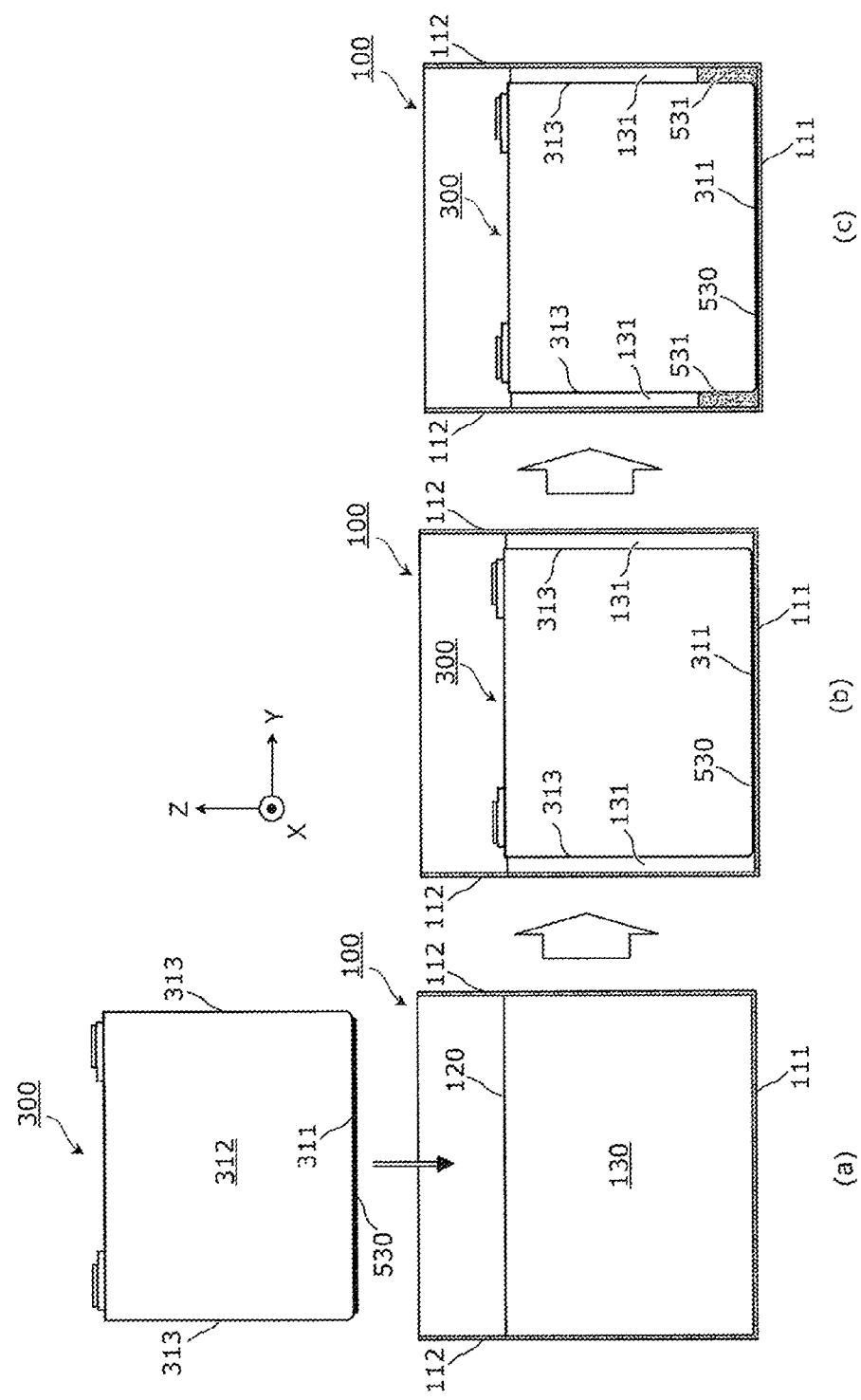
FIG. 11 is a view for describing the steps of adhering the energy storage device to the outer case in the method of manufacturing an energy storage apparatus according to the modification 2 of the embodiment of the present invention.

FIG. 10 is a flowchart showing steps of adhering an energy storage device 300 to an outer case 11 in a method of manufacturing an energy storage apparatus 10 according to the modification 2 of the embodiment of the present invention. FIG. 11 is a view for describing the steps of adhering the energy storage device 300 to the outer case 11 in the method of manufacturing the energy storage apparatus 10 according to the modification 2 of the embodiment of the present invention.

First, as shown in FIG. 10, as the applying step, an adhesive material is applied to a first surface of the energy storage device 300 (S302). To be more specific, as shown in (a) of FIG. 11, an adhesive material 530 is applied to the first surface (an outer surface of a bottom surface portion 311) of the energy storage device 300.

Returning to FIG. 10, next, as the arrangement step, the energy storage device 300 is disposed in the outer case 11 (S304). To be more specific, as shown in (b) of FIG. 11, the energy storage device 300 is disposed in an outer case body 100 such that the adhesive material 530 is disposed between the first surface (the outer surface of the bottom surface portion 311) of the energy storage device 300 and an inner surface of a bottom wall portion 111 of the outer case body 100. The arrangement step is substantially equal to the arrangement step (S104 in FIG. 6) in the above-mentioned embodiment and hence, the detailed description of the arrangement step is omitted.

Returning to FIG. 10, next, as an injecting step (post-arrangement injecting step), an adhesive material is injected into the outer case 11 (S306). To be more specific, as shown in (c) of FIG. 11, an adhesive material 531 is injected into gaps 131 formed between second surfaces (outer surfaces of short side surface portions 313) of the energy storage device 300 and inner surfaces (inner surfaces of side wall portions 112 of the outer case body 100) of the outer case 11. The post-arrangement injecting step is substantially equal to the post-arrangement injecting step (S106 in FIG. 6) in the above-mentioned embodiment and hence, the detailed description of the post-arrangement injecting step is omitted.

Returning to FIG. 10, next, as an adhesion step, by performing the applying step, the arrangement step, and the injecting step (post-arrangement injecting step), the first surface and the second surfaces which are two surfaces of the energy storage device 300 disposed adjacently to each other are adhered to the inner surfaces of the outer case 11 respectively by surface adhesion (S308). That is, since the adhesive materials 530, 531 are solidified by drying or the like after the arrangement step and the injecting step, the outer surface of the bottom surface portion 311 and the outer surfaces of the short side surface portions 313 of the energy storage device 300 are adhered to the inner surface of the bottom wall portion 111 and the inner surfaces of the side wall portions 112 of the outer case body 100 respectively by surface adhesion.

As has been described above, the method of manufacturing the energy storage apparatus 10 according to the modification 2 of the embodiment of the present invention can acquire substantially the same advantageous effects as the above-mentioned embodiment. Particularly, in this modification, by applying an adhesive material to the first surface of the energy storage device 300 before the energy storage device 300 is disposed in the outer case 11, the first surface of the energy storage device 300 can be fixed to the outer case 11.

(Modification 3)

Next, a modification 3 of the above-mentioned embodiment is described. In the above-mentioned embodiment, the ante-arrangement injecting step (S102 in FIG. 6) is performed before the arrangement step (S104 in FIG. 6). However, in this modification, the ante-arrangement injecting step is not performed.

Figure 12:
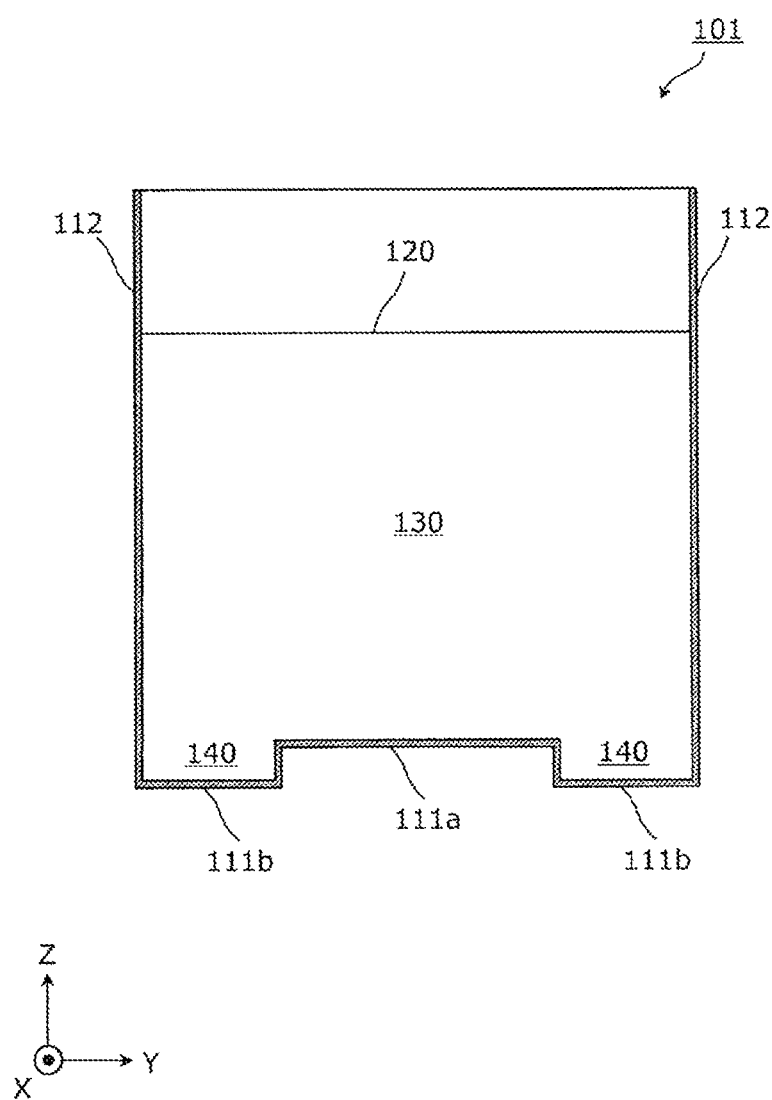
FIG. 12 is a cross-sectional view showing the configuration of an outer case body according to a modification 3 of the embodiment of the present invention.
Figure 13:
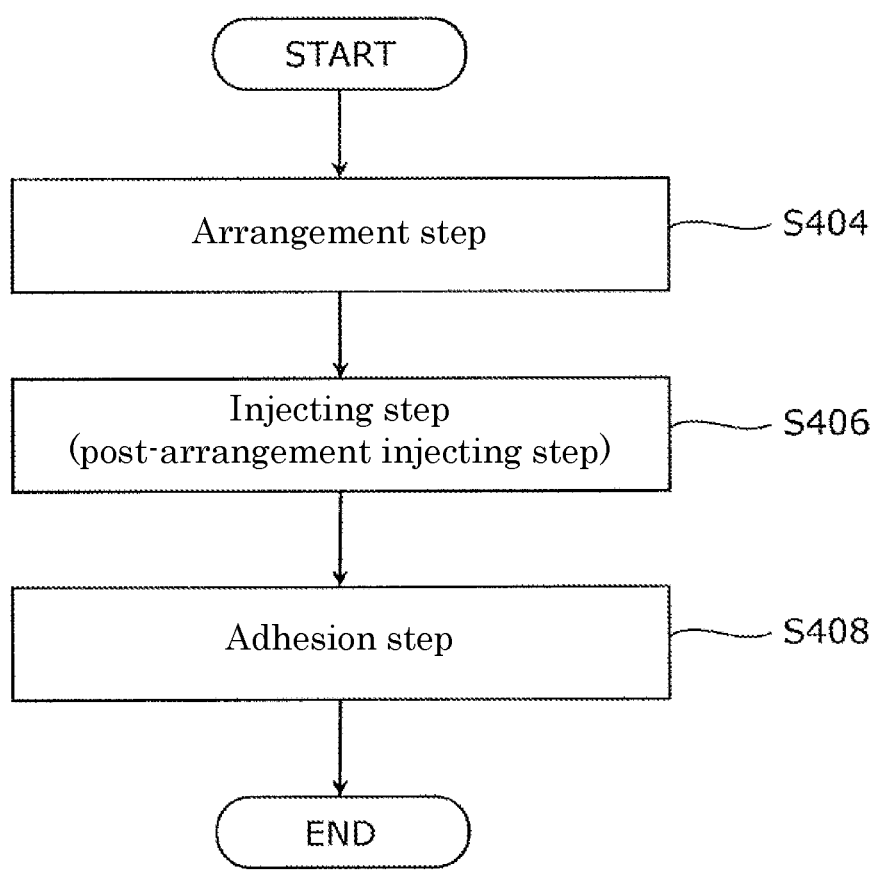
FIG. 13 is a flowchart showing steps of adhering an energy storage device to an outer case in a method of manufacturing an energy storage apparatus according to the modification 3 of the embodiment of the present invention.
Figure 14:
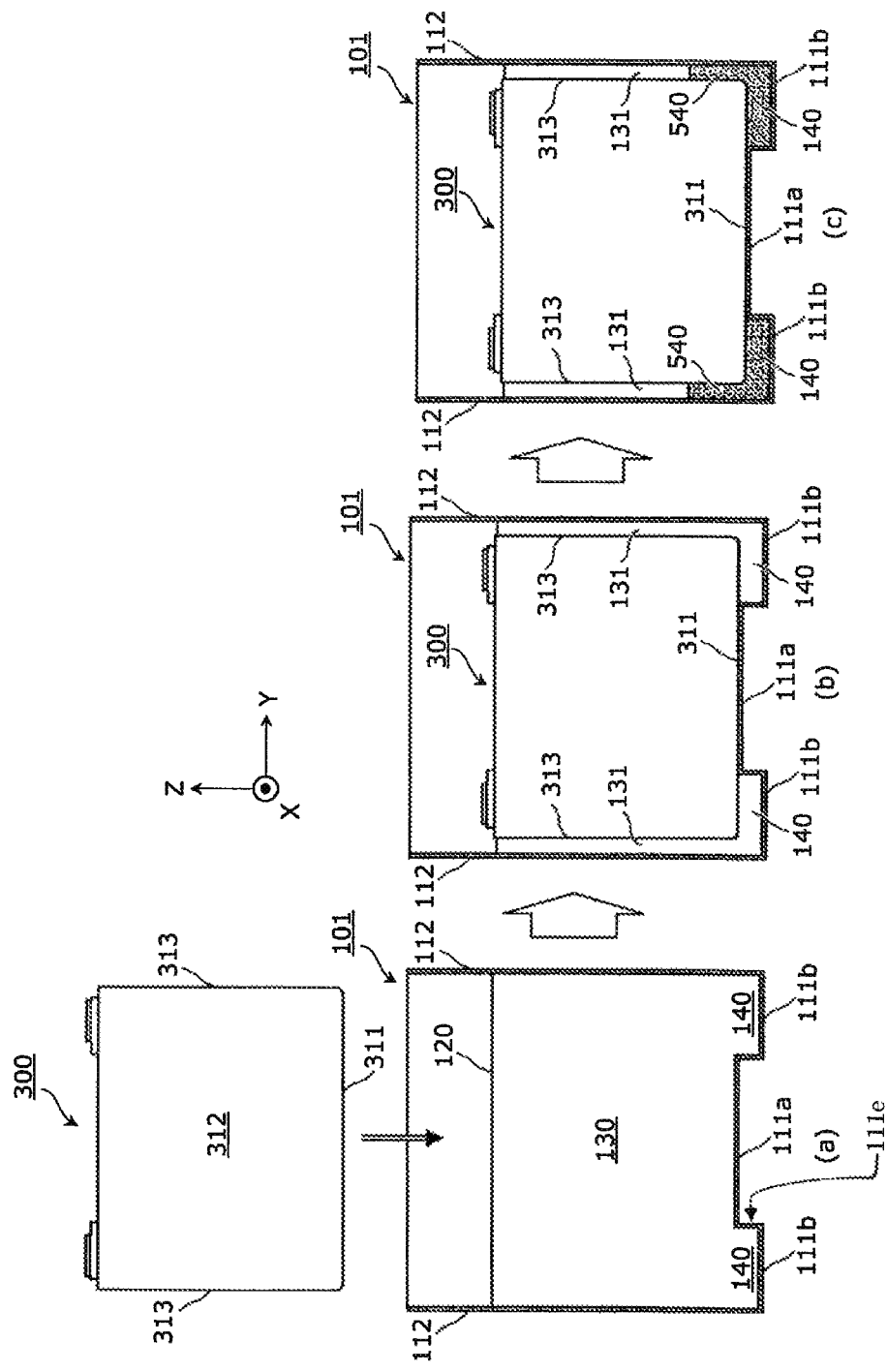
FIG. 14 is a view for describing the steps of adhering the energy storage device to the outer case in the method of manufacturing an energy storage apparatus according to the modification 3 of the embodiment of the present invention.

FIG. 12 is a cross-sectional view showing a configuration of an outer case body 101 according to the modification 3 of the embodiment of the present invention. To be more specific, FIG. 12 is a view which corresponds to FIG. 5B showing the outer case body 100. FIG. 13 is a flowchart showing steps of adhering an energy storage device 300 to an outer case 11 in a method of manufacturing an energy storage apparatus 10 according to the modification 3 of the embodiment of the present invention. FIG. 14 is a view for describing the steps of adhering the energy storage device 300 to the outer case 11 in the method of manufacturing the energy storage apparatus 10 according to the modification 3 of the embodiment of the present invention.

As shown in FIG. 12, the outer case 11 according to this modification includes an outer case body 101 having bottom wall portions 11a, 11b in place of the outer case body 100 having the bottom wall portion 111 in the above-mentioned embodiment. The bottom wall portion 111a is a portion disposed at a center portion of the bottom wall portion of the outer case body 101. The bottom wall portions 111b are portions disposed on both sides of the bottom wall portion 111a so as to sandwich the bottom wall portion 111a from both sides in the Y axis direction, and are connected to the side wall portions 112 respectively.

The bottom wall portion 111a is disposed at a position projecting upward from the bottom wall portions 111b. That is, on the outer case body 101, a projecting portion which projects upward is formed at a position (center portion) of the bottom wall portion 111a.

Further, it is safe to say that the bottom wall portions 111b are disposed at positions recessed downward from the bottom wall portion 111a. That is, in the outer case body 101, recessed portions each having a space 140 are formed at positions of the respective bottom wall portions 111b (both sides in the Y axis direction). The spaces 140 are spaces disposed on a lower side of an accommodating portion 130 for the energy storage device 300. Due to the formation of the spaces 140, when the energy storage device 300 is disposed in the outer case body 101, gaps are formed between an inner surface of the outer case body 101 and an outer surface of a bottom surface portion 311 and outer surfaces of short side surface portions 313 of the energy storage device 300. That is, the outer case 11 has the recessed portions which form gaps between the inner surface of the outer case 11 and a first surface and second surfaces of the energy storage device 300 respectively.

A shape of a partition portion 120 may be a rectangular shape in the same manner as the partition portion 120 in the above-mentioned embodiment. Alternatively, the partition portion 120 may have a shape where a bottom portion of the partition portion 120 projects along the bottom wall portion 11b for forming the accommodating portion 130 disposed adjacently to each other and the spaces 140 by partitioning.

Steps of adhering the energy storage device 300 to the outer case 11 in the outer case body 101 having the above-mentioned configuration is described in detail hereinafter.

First, as shown in FIG. 13, as an arrangement step, the energy storage device 300 is disposed in the outer case 11 (S404). That is, the energy storage device 300 is disposed in the outer case 11 such that an adhesive material can be disposed between the first surface and the second surfaces of the energy storage device 300 and the inner surfaces of the outer case 11 respectively. To be more specific, as shown in (a) and (b) of FIG. 14, the energy storage device 300 is disposed in the outer case body 101 such that an adhesive material can be disposed between the first surface (the outer surface of the bottom surface portion 311) and the second surfaces (the outer surfaces of the short side surface portions 313) of the energy storage device 300 and the inner surface of the bottom wall portion 111b and the inner surfaces of the side wall portions 112 of the outer case body 101.

That is, the energy storage device 300 is placed on the bottom wall portion 111a of the outer case body 101, and the inner surface of the bottom wall portion 111a and the outer surface of the bottom surface portion 311 are brought into contact with each other. In such a state, the recessed portions 111e are formed at positions of the bottom wall portions 111b of the outer case body 101 and hence, the spaces 140 and the gaps 131 are formed between the outer surface of the bottom surface portion 311 and the outer surfaces of the short side surface portion 313 of the energy storage device 300 and the inner surface of the bottom wall portion 111b and the inner surfaces of the side wall portions 112 of the outer case body 101 respectively. Further, an adhesive material can be disposed in the spaces 140 and the gaps 131.

Returning to FIG. 13, next, as an injecting step (post-arrangement injecting step), an adhesive material is injected into the outer case 11 (S406). That is, an adhesive material is injected between the first surface and the second surfaces of the energy storage device 300 and the inner surfaces of the outer case 11. To be more specific, as shown in (c) of FIG. 14, an adhesive material 540 is injected into the spaces 140 and the gaps 131 formed between the first surface (the outer surface of the bottom surface portion 311) and the second surfaces (the outer surfaces of the short side surface portions 313) of the energy storage device 300 and the inner surface (the inner surface of the bottom wall portion 111b and the inner surfaces of the side wall portions 112 of the outer case body 101) of the outer case 11 respectively.

Returning to FIG. 13, next, as an adhesion step, by performing the arrangement step and the injecting step (post-arrangement injecting step), the first surface and the second surface which are two surfaces of the energy storage device 300 disposed adjacently to each other are adhered to the inner surfaces of the outer case 11 respectively (S408). That is, since the adhesive material 540 is solidified by drying or the like after the arrangement step and the injecting step, the outer surface of the bottom surface portion 311 and the outer surfaces of the short side surface portions 313 of the energy storage device 300 are adhered to the inner surfaces of the bottom wall portions 111b and the inner surfaces of the side wall portions 112 of the outer case body 101 respectively by surface adhesion. In this manner, the adhesive material 540 is injected into the recessed portions of the outer case body 101 thus making the first surface and the second surface of the energy storage device 300 and the inner surfaces of the outer case 11 adhere to each other.

As has been described above, the method of manufacturing the energy storage apparatus 10 according to the modification 3 of the embodiment of the present invention can acquire substantially the same advantageous effects as the above-mentioned embodiment. Particularly, in this modification, by injecting an adhesive material between two surfaces of the energy storage device 300 disposed adjacently to each other and the inner surfaces of the outer case 11, such two surfaces of the energy storage device 300 are adhered to the outer case 11. Accordingly, the energy storage device 300 can be easily and firmly adhered to the outer case 11.

The energy storage apparatus 10 according to this modification is configured such that two surfaces of the energy storage device 300 disposed adjacently to each other are adhered to the outer case 11 by the adhesive agent injected into the recessed portions of the outer case 11. Accordingly, the energy storage device 300 can be easily and firmly adhered to the outer case 11.

(Modification 4)

Next, a modification 4 of the above-mentioned embodiment is described. In the above-mentioned embodiment, the outer case body 100 has the planar plate-shaped bottom wall portion 111. However, in this modification, an outer case body has a bottomed wall portion on which projecting portions are formed.

Figure 15:
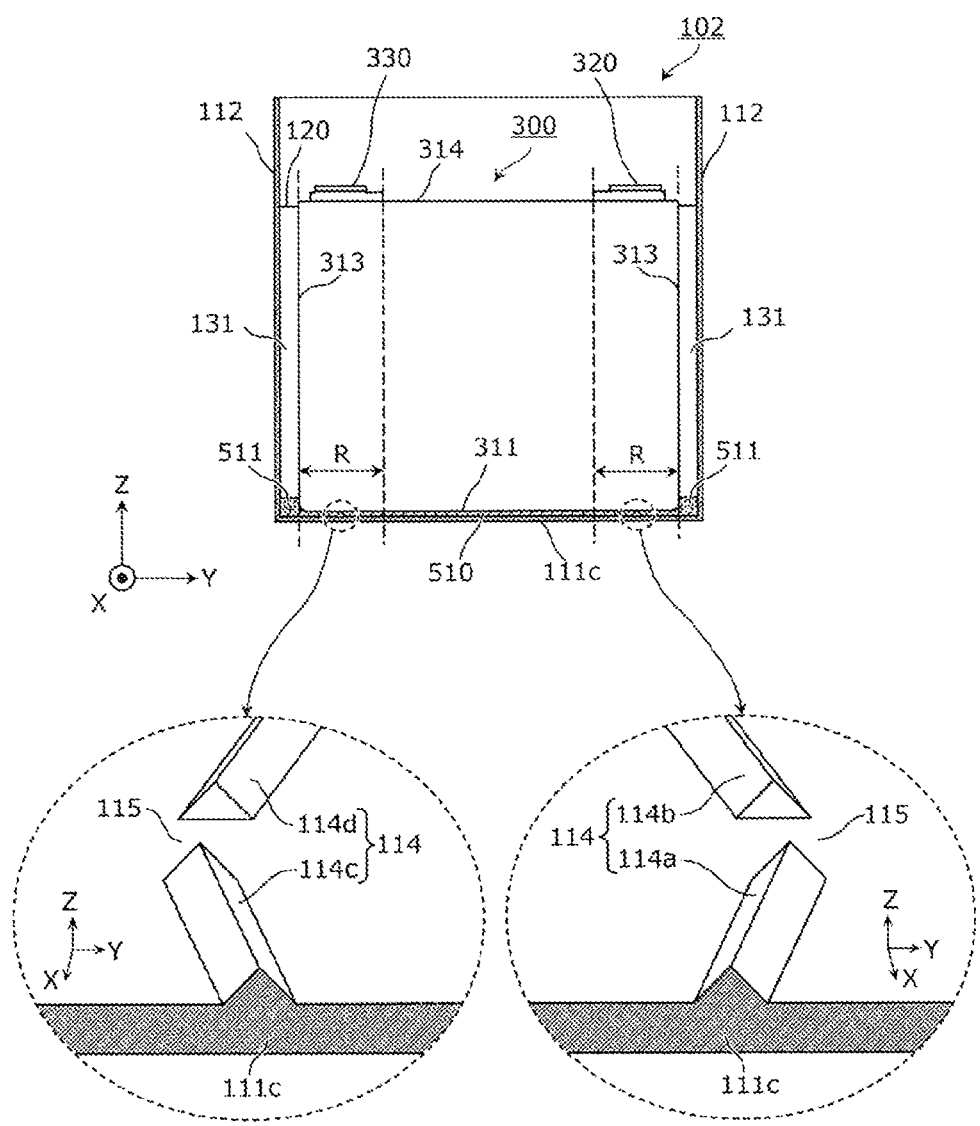
FIG. 15 is a cross-sectional view showing the configuration where an energy storage device according to a modification 4 of the embodiment of the present invention is accommodated in an outer case body.

FIG. 15 is a cross-sectional view showing the configuration where an energy storage device 300 according to the modification 4 of the embodiment of the present invention is accommodated in the outer case body 102.

As shown in FIG. 15, an outer case 11 according to this modification includes the outer case body 102 having a bottom wall portion 111c in place of the outer case body 100 having the bottom wall portion 111 in the above-mentioned embodiment. Projecting portions 114 which project toward the energy storage device 300 are formed on the bottom wall portion 111c. In FIG. 15, also shown are enlarged views of cases where the projecting portions 114 of the bottom wall portion 111c in a state that an adhesive material 510 is not arranged is viewed from an oblique upper side.

The projecting portions 114 are projecting portions which are formed on portions of an inner surface of the outer case 11 which are adhered to the energy storage device 300 by surface adhesion using the adhesive material 510, and extend along the inner surface of the outer case 11. In this modification, on the inner surface of the bottom wall portion 11c, projecting portions 114a to 114d having a triangular cross-sectional shape are formed in an extending manner along the inner surface of the bottom wall portion 11c. The projecting portions 114a, 114b are the projecting portions arranged on a positive electrode side of the energy storage device 300, and the projecting portions 114c, 114d are the projecting portions arranged on a negative electrode side of the energy storage device 300. A projection height of the projecting portions 114 (projecting portions 114a to 114d) is approximately less than 1 mm, for example.

On the inner surface of the outer case 11 (on the inner surface of the bottom wall portion 111c) and on sides of the projecting portions 114, a flow passage 115 for the adhesive material 510 which traverses the projecting portions 114 is formed. To be more specific, the flow passage 115 is arranged in a sandwiched manner between two projecting portions 114 with a distance therebetween narrowed as the projecting portions 114 approach the flow passage 115. That is, the projecting portions 114a, 114b are arranged such that the distance between the projecting portions 114a, 114b is narrowed as the projecting portions 114a, 114b extend toward a plus side in the Y axis direction. A space is formed between distal end portions of the projecting portions 114a, 114b on the plus side in the Y axis direction, and this space forms the flow passage 115 on a positive electrode side. In the same manner as the projecting portions 114a, 114b, in the projecting portions 114c, 114d, a distance between the projecting portions 114c, 114d is narrowed as the projecting portions 114c, 114d extend toward a minus side in the Y axis direction, a space is formed between distal end portions of the projecting portions 114c, 114d on the minus side in the Y axis direction, and this space forms the flow passage 115 on a negative electrode side.

In this modification, as viewed from the projecting direction (Z axis direction) of the projecting portion 114, the projecting portion 114 is arranged at a position where at least a portion of the projecting portion 114 overlaps with an area ranging from the electrode terminal which the energy storage device 300 has to an end portion of the energy storage device 300 (a region R shown in FIG. 15). To be more specific, in this modification, the projecting portions 114a, 114b are arranged just below a positive electrode terminal 320 of the energy storage device 300, and the projecting portions 114c, 114d are arranged just below a negative electrode terminal 330 of the energy storage device 300. With such a configuration, the flow passages 115 are also arranged just below the positive electrode terminal 320 and the negative electrode terminal 330. In this manner, the plurality of projecting portions 114 are formed on the inner surface of the outer case 11 with respect to the respective energy storage devices 300.

Provided that a portion of the projecting portion 114 is arranged within a range of the region R shown in FIG. 15, the projecting portion 114 may be arranged at any position. However, it is preferable that the projecting portion 114 be arranged just below the position where the energy storage device 300 is pressed when the energy storage device 300 is adhered to the outer case 11. For example, it is preferable that the projecting portions 114a, 114b be arranged just below the center position of the positive electrode terminal 320 of the energy storage device 300 in the Y axis direction or just below an end portion of a container lid portion 314 of the energy storage device 300 on a positive electrode side (the plus side in the Y axis direction). Further, it is preferable that the projecting portions 114c, 114d be arranged just below the center position of the negative electrode terminal 330 of the energy storage device 300 in the Y axis direction or just below an end portion of the container lid portion 314 of the energy storage device 300 on a negative electrode side (the minus side in the Y axis direction). Further, from a viewpoint of making the adhesive material 510 flow out uniformly, it is preferable that the flow passage 115 be arranged just below the center position of the container lid portion 314 in the X axis direction.

In the above-mentioned configuration, the adhesive material 510 is injected between the projecting portions 114a, 114b and the projecting portions 114c, 114d on the bottom wall portion 111c, in a space formed on a right side of the projecting portions 114a, 114b, and in a space formed on a left side of the projecting portions 114c, 114d. Then, the energy storage device 300 is placed on the bottom wall portion 111c, and is pressed from above so that the energy storage device 300 is adhered to the outer case 11. In this case, when a slightly larger amount of adhesive material 510 is injected between the projecting portions 114a, 114b and the projecting portions 114c, 114d, a surplus amount of adhesive material 510 flows out from the flow passage 115 while being guided by the projecting portions 114. Further, the adhesive material 510 is pushed out also to a gap 131 formed between an outer surface of a short side surface portion 313 of the energy storage device 300 and an inner surface of a side wall portion 112 of the outer case body 102 (adhesive material 511 in FIG. 15).

When the adhesive material 510 flows out from the flow passage 115, a state is brought about where the adhesive material 510 is arranged in the flow passage 115. On the other hand, when the adhesive material 510 does not flow out from the flow passage 115, the adhesive material 510 is not arranged in the flow passage 115 so that the flow passage forms a space. The adhesive material 510 may be arranged or may not be arranged between the projecting portion 114 and a bottom surface portion 311 of the energy storage device 300. Further, the adhesive material 511 may not be pushed out into the gap 131, and the adhesive material 511 may be injected into the gap 131 after the energy storage device 300 is arranged in the outer case body 102.

As has been described above, the energy storage apparatus 10 according to the modification 4 of the embodiment of the present invention can acquire substantially the same advantageous effects as the above-mentioned embodiment. Particularly, in this modification, the projecting portions 114 are formed on an adhesive surface of the outer case 11 with the energy storage device 300 and hence, a thickness of the adhesive material 510 can be defined by a height of the projecting portions 114. Accordingly, the thickness of the adhesive material 510 can be set to an optimum thickness so that the energy storage device 300 can be easily and firmly adhered to the outer case 11.

The flow passage 115 for the adhesive material 510 is formed on the side of the projecting portion 114. Accordingly, after injecting of the adhesive material 510, when an amount of adhesive material 510 is large, it is possible to make the adhesive material 510 flow out through the flow passage 115. Further, when an amount of adhesive material 510 is small, it is possible to make the adhesive material 510 flow in through the flow passage 115. Accordingly, an amount of the adhesive material 510 can be adjusted by the flow passage 115 and hence, the energy storage device 300 can be easily and firmly adhered to the outer case 11.

Two projecting portions 114 where the distance between the projecting portions 114 is narrowed as the projecting portions 114 approach the flow passage 115 are arranged on both sides of the flow passage 115 for the adhesive material 510. Accordingly, when an amount of the adhesive material 510 is large, a surplus amount of adhesive material 510 flows to the flow passage 115 while being guided by the projecting portions 114 and is made to flow out from the flow passage 115. As a result, a surplus amount of adhesive material 510 can be easily made to flow out by the projecting portions 114 and hence, an amount of adhesive material 510 can be easily adjusted.

The plurality of projecting portions 114 are formed for each energy storage device 300 and hence, each energy storage device 300 can be easily adhered to the outer case 11 while being supported by the plurality of projecting portions 114.

At least a portion of the projecting portion 114 is arranged just below the region ranging from the electrode terminal to the end portion of the energy storage device 300. Accordingly, in fixing the energy storage device 300 by pressing the electrode terminal or the end portion of the energy storage device 300, the energy storage device 300 can be stably fixed to the outer case 11.

The numbers and the shapes of the projecting portions 114 and the flow passages 115 formed on the bottom wall portion 111c of the outer case body 102 are not limited to the above-mentioned numbers and shapes. As other examples of the projecting portions 114 and the flow passages 115, the following configurations are considered, for example.

The cross section of the projecting portion 114 is not limited to a triangular shape, and may be a polygonal shape (a quadrangular shape or the like) besides a triangular shape, a curved shape such as a semicircular shape, a semi-oblong shape or a semielliptical shape. However, with respect to a cross section of the projecting portion 114, a cross section having a shape where a width is narrowed toward an upper end makes an adhesive material difficult to remain on a distal end of the projecting portion 114 and hence, such a shape is preferable. Further, when a cross section of the projecting portion 114 has a shape formed of a curve, a force which the projecting portion 114 receives from above can be dispersed.

Further, as the projecting portions 114, three or more projecting portions may be formed along the bottom surface portion 311 of the energy storage device 300. In this case, by changing heights of the projecting portions 114 in conformity with a shape of the bottom surface portion 311, the energy storage device 300 can be firmly fixed to the outer case 11. For example, when the bottom surface portion 311 is warped upward, a height of the projecting portion 114 is set higher as the projecting 114 extends toward a center portion.

The projecting portions 114 may not be extended in a straight line shape along the inner surface of the bottom wall portion 111c, and may be extended in a curved shape. For example, the projecting portions 114 may be formed in a curved or bent shape such as an S shape, a V shape, a U shape or a W shape. Further, the projecting portions 114 may be formed in a non-extending shape such as a polygonal columnar shape, a circular columnar shape or a semispherical shape. For example, the projecting portions 114 can be formed by emboss processing. In this case, a contact area between the energy storage device 300 and the bottom wall portion 111c can be increased and hence, a strength of the outer case 11 can be enhanced.

The projecting portions 114 may be formed in a shape where the projecting portion 114 extends in the Y axis direction. Alternatively, the projecting portions 114 may be formed in a shape where the projecting portions 114 extend in a plurality of directions among the X axis direction, the Y axis direction and oblique directions and intersect with each other (for example, a meshed shape).

The projecting portions 114 may not be formed by working, and the projecting portion 114 may be formed by making use of a shape where roughness after working remains.

The flow passage 115 may not be arranged between two projecting portions 114, and a space arranged on a side of the projecting portion 114 may be used as the flow passage 115. Further, the flow passage 115 may be a space formed by indenting an upper surface of one projecting portion 114, and a cross-sectional shape of such an indented portion may be any shape such as a rectangular shape, a V shape or a U shape. The flow passage 115 may be a through hole formed in the projecting portion 114, and a cross-sectional shape of the through hole may be any shape such as a polygonal shape, a circular shape or a semicircular shape. That is, it is sufficient that the flow passage 115 be a flow passage (space) which traverses the projecting portion 114, and the shape of the flow passage 115 is not limited.

(Modification 5)

Next, a modification 5 of the above-mentioned embodiment is described. In the above-mentioned embodiment, as shown in FIG. 5B, the adhesive material 511 is injected only up to a relatively low position of the short side surface portions 313 of the energy storage device 300. However, in this modification, an adhesive material is injected up to a relatively high position of short side surface portions 313 of an energy storage device 300.

Figure 16A:
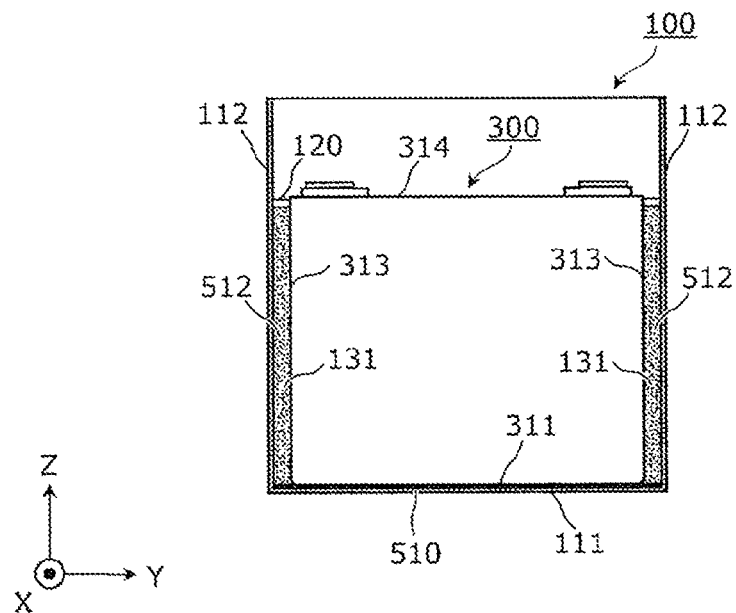
FIG. 16A is a cross-sectional view showing the configuration where an energy storage device according to a modification 5 of the embodiment of the present invention is accommodated in an outer case body.
Figure 16B:
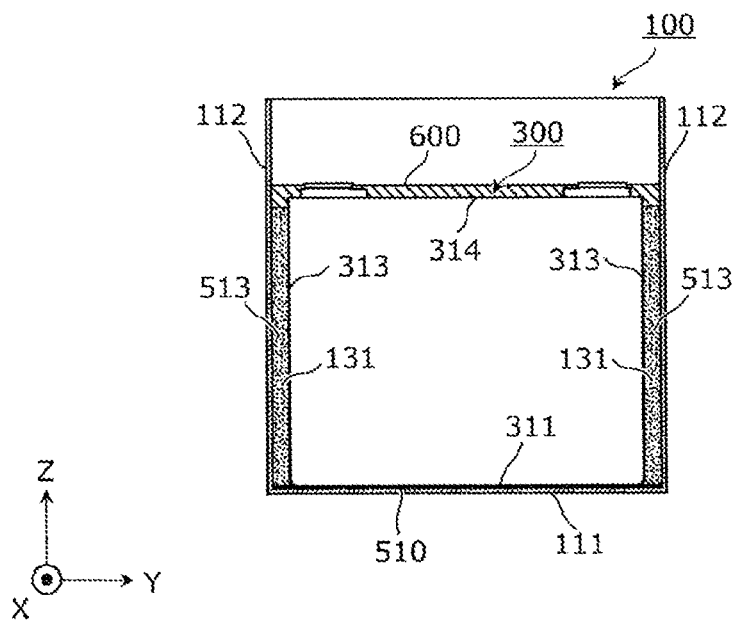
FIG. 16B is a cross-sectional view showing the configuration where the energy storage device according to the modification 5 of the embodiment of the present invention is accommodated in the outer case body.

FIG. 16A and FIG. 16B are cross-sectional views showing the configuration where the energy storage device 300 according to the modification 5 of the embodiment of the present invention is accommodated in an outer case body 100. To be more specific, FIG. 16A and FIG. 16B are views which correspond to FIG. 5B.

First, as shown in FIG. 16A, an adhesive material 512 is injected up to upper end portions of the short side surface portions 313 of the energy storage device 300. That is, an adhesive material 510 is injected between a first surface (an outer surface of a bottom surface portion 311) of the energy storage device 300 and an inner surface (an inner surface of a bottom wall portion 111 of the outer case body 100) of the outer case 11, and an adhesive material 512 is injected between second surfaces (outer surfaces of the short side surface portions 313) of the energy storage device 300 and inner surfaces (inner surfaces of side wall portions 112 of the outer case body 100) of the outer case 11.

Although an injecting height of the adhesive material 512 is not particularly limited, in this modification, the injecting height of the adhesive material 512 is set equal to or more than an injecting height in the above-mentioned embodiment (for example, one fourth or more of a height of the short side surface portions 313 of the energy storage device 300). In this manner, the adhesive material 512 is injected between a bottom surface of the energy storage device 300 which forms the first surface and the inner surface of the outer case 11 and is also injected between surfaces of side surfaces of the energy storage device 300 which form the second surfaces ranging from lower ends of the side surfaces to a predetermined height from the lower ends and the inner surfaces of the outer case 11.

As shown in FIG. 16B, the energy storage apparatus 10 includes a bus bar frame 600 for positioning bus bars 400 with respect to the energy storage devices 300 above the energy storage devices 300, and the adhesive material 513 may be injected up to a height of the bus bar frame 600.

As has been described above, the energy storage apparatus 10 according to the modification 5 of the embodiment of the present invention can acquire substantially the same advantageous effects as the above-mentioned embodiment. Particularly, in this modification, the energy storage apparatus 10 is configured such that the energy storage apparatus 10 includes an adhesive material injected up to a predetermined height of the side surfaces of the energy storage device 300 and hence, the energy storage device 300 can be easily and firmly adhered to the outer case 11. In FIG. 16B, the bus bar frame 600 also has a function of fixing the energy storage device 300 to the outer case body 100 by pressing the energy storage device 300 from above and hence, the bus bar frame 600 can further firmly fix the energy storage device 300 to the outer case body 100 by the adhesive material 513.

(Modification 6)

Next, a modification 6 of the above-mentioned embodiment is described. In the above-mentioned embodiment, the outer case body 100 has the partition portions 120 which are disposed between two side wall portions 112 of the outer case body 100 in an extending manner. However, in this modification, an outer case body has rib-shaped partition portions.

Figure 17:
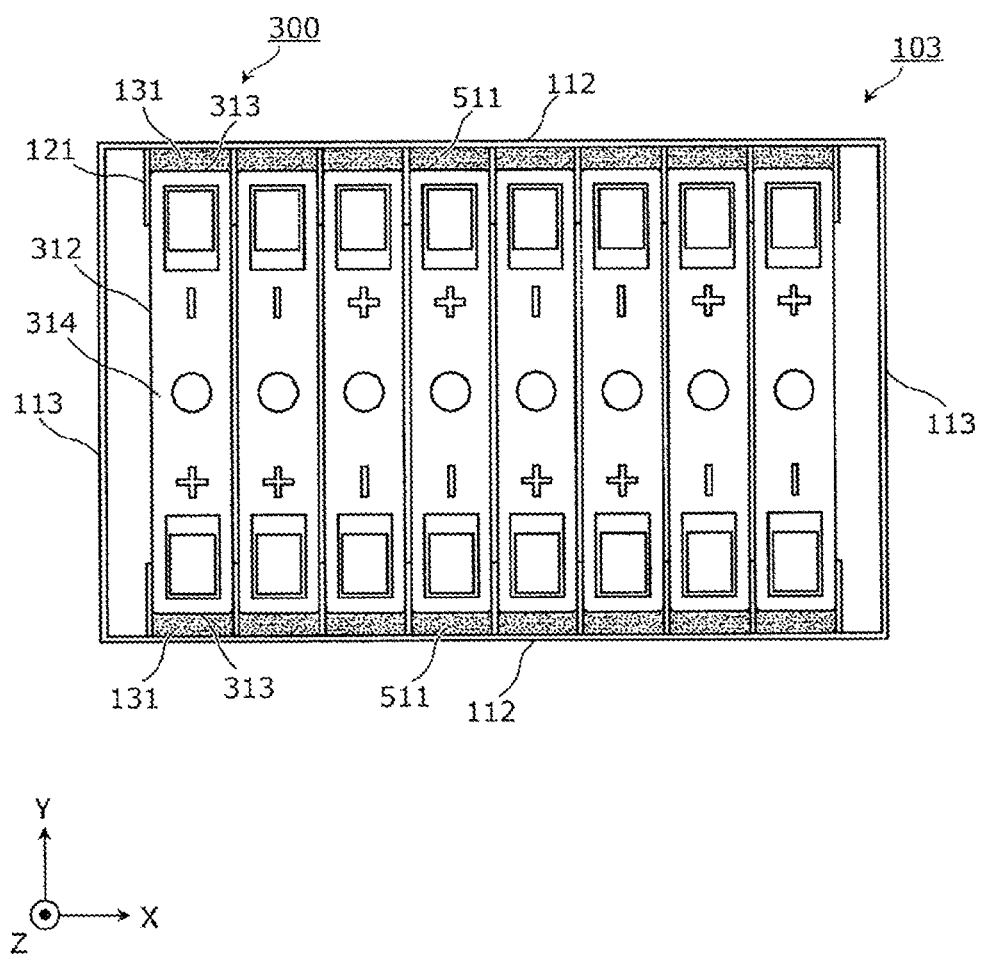
FIG. 17 is a plan view showing the configuration where an energy storage device according to a modification 6 of the embodiment of the present invention is accommodated in an outer case body.

FIG. 17 is a plan view showing a configuration where an energy storage device 300 according to the modification 6 of the embodiment of the present invention is accommodated in an outer case body 103. To be more specific, FIG. 17 is a view corresponding to FIG. 5A.

As shown in FIG. 17, an outer case body 103 has partition portions 121 in place of the partition portions 120 of the outer case body 100 of the above-mentioned embodiment. The partition portions 121 are rectangular-shaped flat-plate-like ribs which project from the side wall portions 112. That is, the partition portion 121 is configured such that a center portion of the partition portion 120 in the above-mentioned embodiment is cut away.

An adhesive material 511 is injected into gaps 131 each of which is formed between the partition portions 121. Provided that a gap 131 which allows injecting of an adhesive material 511 into the gap 131 can be formed in this manner, a shape of the partition portion 121 is not limited to the shape in the above-mentioned embodiment.

As has been described above, the energy storage apparatus 10 according to the modification 6 of the embodiment of the present invention can acquire substantially the same advantageous effects as the above-mentioned embodiment. Particularly, in this modification, the partition portion 121 can be formed small in size and hence, an amount of a material used for forming the outer case body 103 can be reduced.

It is unnecessary to replace all partition portions 120 of the above-mentioned embodiment with the partition portions 121 of this modification 6. That is, there is no problem in providing the partition portions 120 of the above-mentioned embodiment at some places. For example, in FIG. 17, one set of energy storage device group is formed by connecting two energy storage devices 300 in parallel, and four sets of energy storage device groups are connected to each other in series. In such a configuration, it is preferable that the partition portion 120 of the above-mentioned embodiment be disposed between the energy storage devices 300 connected to each other in series. Accordingly, the partition portion 120 of the above-mentioned embodiment may be disposed between the energy storage device groups, and the partition portion 121 of this modification may be disposed between the energy storage devices 300 in each energy storage device group.

Although the energy storage apparatus 10 according to the embodiment of the present invention and the modifications of the embodiment have been described heretofore, the present invention is not limited to the above-mentioned embodiment and the modifications of the embodiment. That is, it should be construed that the embodiment and the modifications of the embodiment disclosed in this specification are only for an exemplifying purpose in all aspects and are not limited. The scope of the present invention is not designated by the above-mentioned description but is designated by Claims, and it is intended that all modifications which fall within the meaning and the scope equivalent to Claims are also included in the scope of the present invention.

For example, in the above-mentioned embodiment and the modifications of the embodiment, the energy storage apparatus 10 includes the plurality of energy storage devices 300. However, the energy storage apparatus 10 may include only one energy storage device 300.

In the above-mentioned embodiment and the modifications of the embodiment, the adhesive material is an adhesive agent. However, the adhesive material is not limited to the adhesive agent, and may be a double-applied adhesive tape, or an adhesive material having the surface fastener structure which allows the adhesion in a detachable manner and is referred to as Magic Tape (registered trademark) or Velcro (registered trademark) tape.

In the above-mentioned embodiment and the modifications of the embodiment, an adhesive material is disposed on both short side surface sides of all energy storage devices 300. However, with respect to some energy storage devices 300, an adhesive material may not be disposed on either one of both short side surface sides. For example, in the above-mentioned modification 3, the outer case body 101 may be configured such that the outer case body 101 has only one bottom wall portion 111*b* on one side wall portion 112 side (only one recessed portion is formed).

In the above-mentioned embodiment and the modifications of the embodiment, an adhesive material is injected between two surfaces of the energy storage device 300, that is, the first surface (the outer surface of the bottom surface portion 311) and the second surface (the outer surfaces of the short side surface portions 313) of the energy storage device 300 and inner surfaces of the outer case 11 thus making the two surfaces of the energy storage device 300 and the inner surfaces of the outer case 11 adhere to each other respectively by surface adhesion. However, the adhesive material may not be injected with respect to either one of between the first surface of the energy storage device 300 and the inner surface of the outer case 11 or between the second surface of the energy storage device 300 and the inner surface of the outer case 11 so that either one of the first surface or the second surface of the energy storage device 300 may not be adhered to the inner surface of the outer case 11 by surface adhesion.

In the above-mentioned embodiment and the modifications of the embodiment (excluding the modification 3), the entire outer surface of the bottom surface portion 311 of the energy storage device 300 is adhered to the inner surface of the bottom wall portion 111 of the outer case body by surface adhesion. However, a region where the surface adhesion is applied is not limited to the entire outer surface of the bottom surface portion 311 and may be a partial region of the outer surface of the bottom surface portion 311.

In the above-mentioned embodiment and the modifications of the embodiment, the energy storage device 300 is disposed such that the container lid portion 314 is directed upward. That is, the outer surface of the bottom surface portion 311 of the energy storage device 300 forms the first surface, and the outer surfaces of the short side surface portions 313 of the energy storage device 300 form the second surfaces. However, the energy storage device 300 may be disposed such that the container lid portion 314 is directed sideward. That is, for example, the outer surface of the short side surface portion 313 of the energy storage device 300 forms the first surface, and the outer surface of the bottom surface portion 311 and the outer surface of the container lid portion 314 form the second surfaces. Further, the energy storage device 300 may be disposed such that the container lid portion 314 is directed downward, and the outer surface of the container lid portion 314 may form the first surface. Still further, the outer surface of the long side surface portion 312 may form the first surface or the second surface.

Further, the configurations which are formed by arbitrarily combining the respective constitutional elements which the above-mentioned embodiment and the modifications of the embodiment include are also included in the scope of the present invention. For example, the configuration of the modification 3 may be applied to other modifications, the configuration of the modification 4 may be applied to other modifications, the configuration of the modification 5 may be applied to other modifications, and the configuration of the modification 6 may be applied to other modifications.

INDUSTRIAL APPLICABILITY

The present invention is applicable to an energy storage apparatus including an energy storage device such as a lithium ion secondary battery or the like.

DESCRIPTION OF REFERENCE SIGNS

10: energy storage apparatus
11: outer case
100, 101, 102, 103: outer case body
110: casing
111, 111*a*, 111*b*, 111*c*: bottom wall portion
112, 113: side wall portion
114, 114*a*, 114*b*, 114*c*, 114*d*: projecting portion
115: flow passage
120, 121: partition portion
130: accommodating portion 131: gap
140: space
200: lid body
210: positive electrode external terminal
220: negative electrode external terminal
300: energy storage device
310: container
311: bottom surface portion
312: long side surface portion
313: short side surface portion
314: container lid portion
320: positive electrode terminal
330: negative electrode terminal
400: bus bar
510, 511, 512, 513, 520, 521, 522, 530, 531, 540: adhesive material
600: bus bar frame

The invention claimed is:

1. An energy storage apparatus comprising:
an energy storage device;
an outer case; and
an adhesive material which is injected between at least one surface out of a first surface and a second surface which are two surfaces of the energy storage device disposed adjacently to each other and an inner surface of the outer case thus making the at least one surface and the inner surface of the outer case adhere to each other by surface adhesion,
wherein the inner surface of the outer case includes a projecting portion which projects toward the energy storage device, and
wherein the projecting portion and the energy storage device are brought into contact and abut with each other.

2. The energy storage apparatus according to claim 1, wherein a flow passage for the adhesive material which traverses the projecting portion is formed on the inner surface of the outer case and on a side of the projecting portion.

3. The energy storage apparatus according to claim 2, wherein the projection portion includes two projection portions which extend along inner surfaces of the outer case,
the flow passage is sandwiched by two projecting portions, and
a distance between the two projecting portions is narrowed as the projecting portions approach the flow passage.

4. The energy storage apparatus according to claim 1, wherein the energy storage apparatus includes a plurality of energy storage devices, and
a plurality of projecting portions is formed on the inner surface of the outer case corresponding to the respective energy storage devices.

5. The energy storage apparatus according to claim 1, wherein the energy storage device includes an electrode terminal,
at least a portion of the projecting portion overlaps with a region ranging from the electrode terminal to an end portion of the energy storage device as viewed in a projecting direction of the projecting portion.

6. The energy storage apparatus according to claim 1, wherein the energy storage device is arranged in the outer case without being exposed from a wall surface of the outer case.

7. The energy storage apparatus according to claim 1, wherein the outer case includes a partition portion which partitions an inside of the outer case so as to form an accommodating portion for the energy storage device.

8. The energy storage apparatus according to claim 1, wherein the outer case includes a recessed portion which forms a gap between an inner surface of the outer case and the first surface and the second surface of the energy storage device, and
the adhesive material is injected into the recessed portion and adhere the first surface and the second surface of the energy storage device and the inner surface of the outer case to each other by surface adhesion.

9. The energy storage apparatus according to claim 1, wherein the first surface comprises a bottom surface of the energy storage device and the second surface comprises a side surface of the energy storage device,
the adhesive material is injected between the first surface and the inner surface of the outer case and between the second surface ranging from a lower end of the side surface to a predetermined height from the lower end and the inner surface of the outer case.

10. A method of manufacturing an energy storage apparatus which includes an energy storage device and an outer case, the method comprising:
arranging the energy storage device in the outer case;
injecting an adhesive material into the outer case; and
adhering at least one surface out of a first surface and a second surface which are two surfaces of the energy storage device disposed adjacently to each other to an inner surface of the outer case by surface adhesion by performing the arranging and the injecting,
wherein the inner surface of the outer case has a projecting portion which projects toward the energy storage device, and
wherein the projecting portion and the energy storage device are brought into contact and abut with each other.

11. The method of manufacturing an energy storage apparatus according to claim 10, wherein the injecting includes an ante-arrangement injecting where an adhesive material is injected on a surface of the outer case which oppositely faces the first surface of the energy storage device in the outer case before the arranging,
in the arranging, the energy storage device is arranged in the outer case such that an adhesive material is arranged between the first surface and the second surface of the energy storage device and the inner surface of the outer case, and
in the adhering, the first surface and the second surface of the energy storage device are adhered to the inner surface of the outer case by surface adhesion.

12. The energy storage apparatus according to any one of claim 1, wherein the inner surface of the outer case has a plurality of projecting portions which project toward the energy storage device.

13. The energy storage apparatus according to claim 12, wherein the adhesive material is arranged between the plurality of projecting portions.

14. The energy storage apparatus according to claim 12, wherein the inner surface of the outer case has side wall portions,
wherein the adhesive material is arranged between the side wall portions and the plurality of projecting portions.

15. An energy storage apparatus comprising:
an energy storage device;
an outer case; and an adhesive material which is injected between at least one surface out of a first surface and a second surface which are two surfaces of the energy storage device disposed adjacently to each other and an inner surface of the outer case thus making the at least one surface and the inner surface of the outer case adhere to each other by surface adhesion, wherein the outer case includes a recessed portion which forms a gap between an inner surface of the outer case and the first surface and the second surface of the energy storage device, and the adhesive material is positioned in the recessed portion and along the first surface and the second surface of the energy storage device continuously and adhere the first surface and the second surface of the energy storage device and the inner surface of the outer case to each other by surface adhesion.

16. The energy storage apparatus according to claim 15, wherein the inner surface of the outer case includes a projecting portion which projects toward the energy storage device, and wherein the projecting portion and the energy storage device are brought into contact and abut with each other.

* * * * *